United States Patent
Manamohan et al.

(10) Patent No.: US 11,748,835 B2
(45) Date of Patent: Sep. 5, 2023

(54) SYSTEMS AND METHODS FOR MONETIZING DATA IN DECENTRALIZED MODEL BUILDING FOR MACHINE LEARNING USING A BLOCKCHAIN

(71) Applicant: HEWLETT PACKARD ENTERPRISE DEVELOPMENT LP, Houston, TX (US)

(72) Inventors: Sathyanarayanan Manamohan, Bangalore (IN); Vishesh Garg, Bangalore (IN); Krishnaprasad Lingadahalli Shastry, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 616 days.

(21) Appl. No.: 16/773,397

(22) Filed: Jan. 27, 2020

(65) Prior Publication Data

US 2021/0233192 A1 Jul. 29, 2021

(51) Int. Cl.
*H04L 9/32* (2006.01)
*G06F 16/22* (2019.01)
(Continued)

(52) U.S. Cl.
CPC ....... *G06Q 50/265* (2013.01); *G06F 16/2246* (2019.01); *G06F 16/2255* (2019.01);
(Continued)

(58) Field of Classification Search
CPC .. G06Q 50/265; G06Q 10/10; G06Q 20/0655; G06Q 20/388; G06Q 20/401;
(Continued)

(56) References Cited

U.S. PATENT DOCUMENTS 9,413,779 B2   8/2016   Vasseur et al.
9,569,517 B1   2/2017   Smola et al.
(Continued)

FOREIGN PATENT DOCUMENTS

AU    2017100968 A4   9/2017
CN    106228446 A     12/2016
(Continued)

OTHER PUBLICATIONS

Kate et al., "Distributed Key Generation in the Wild", Report 2012/377, 2012, pp. 1-30.
(Continued)

*Primary Examiner* — Jacob C. Coppola
*Assistant Examiner* — Vincent I Idiake
(74) *Attorney, Agent, or Firm* — Sheppard Mullin Richter & Hampton LLP

(57) ABSTRACT

Systems and methods are provided for leveraging blockchain technology in a swarm learning context, where nodes of a blockchain network that contribute data to training a machine learning model using their own local data can be rewarded. In order to conduct such data monetization in a fair and accurate manner, the systems and methods rely on various phases in which Merkle trees are used and corresponding Merkle roots are registered in a blockchain ledger. Moreover, any claims for a reward are challenged by peer nodes before the reward is distributed.

20 Claims, 12 Drawing Sheets

(51) Int. Cl.

| | | |
|---|---|---|
| *G06N 20/20* | (2019.01) | |
| *G06Q 20/06* | (2012.01) | |
| *G06F 16/23* | (2019.01) | |
| *G06N 20/00* | (2019.01) | |
| *G06Q 20/38* | (2012.01) | |
| *G06Q 50/26* | (2012.01) | |
| *H04L 9/40* | (2022.01) | |
| *G06Q 30/018* | (2023.01) | |
| *G06Q 10/10* | (2023.01) | |
| *G06Q 20/40* | (2012.01) | |
| *G06Q 30/0207* | (2023.01) | |
| *G06Q 40/04* | (2012.01) | |

(52) U.S. Cl.
CPC ...... *G06F 16/2315* (2019.01); *G06F 16/2365* (2019.01); *G06N 20/00* (2019.01); *G06N 20/20* (2019.01); *G06Q 10/10* (2013.01); *G06Q 20/0655* (2013.01); *G06Q 20/388* (2013.01); *G06Q 20/401* (2013.01); *G06Q 30/0185* (2013.01); *G06Q 30/0215* (2013.01); *G06Q 40/04* (2013.01); *H04L 9/3236* (2013.01); *H04L 63/0435* (2013.01); *G06Q 2220/00* (2013.01); *G06Q 2220/10* (2013.01)

(58) Field of Classification Search
CPC ........... G06Q 30/0185; G06Q 30/0215; G06Q 40/04; G06Q 2220/00; G06Q 2220/10; G06Q 20/3827; G06F 16/2246; G06F 16/2255; G06F 16/2315; G06F 16/2365; G06F 21/6218; G06F 16/27; G06F 21/602; G06N 20/00; G06N 20/20; G06N 3/006; G06N 3/0454; G06N 3/08; H04L 9/3236; H04L 63/0435; H04L 9/3239; H04L 9/3271; H04L 9/50; H04L 63/12
See application file for complete search history.

(56) References Cited

U.S. PATENT DOCUMENTS

| | | | |
|---|---|---|---|
| 9,633,315 | B2 | 4/2017 | Chapelle et al. |
| 9,779,557 | B2 | 10/2017 | Hauser et al. |
| 9,875,510 | B1 | 1/2018 | Kasper |
| 10,057,243 | B1 | 8/2018 | Kumar et al. |
| 10,360,500 | B2 | 7/2019 | Kabul et al. |
| 10,547,679 | B1 | 1/2020 | Burnett et al. |
| 10,671,435 | B1 | 6/2020 | Gold et al. |
| 11,201,747 | B2 | 12/2021 | Scherrer et al. |
| 11,334,817 | B2 | 5/2022 | Wang et al. |
| 2012/0039473 | A1 | 2/2012 | Gentry et al. |
| 2013/0290223 | A1 | 10/2013 | Chapelle et al. |
| 2015/0193697 | A1 | 7/2015 | Vasseur et al. |
| 2015/0324690 | A1 | 11/2015 | Chilimbi et al. |
| 2015/0332283 | A1 | 11/2015 | Witchey |
| 2016/0087854 | A1 | 3/2016 | Jayanti et al. |
| 2016/0217388 | A1 | 7/2016 | Okanohara et al. |
| 2016/0261690 | A1 | 9/2016 | Ford |
| 2016/0335533 | A1 | 11/2016 | Davis et al. |
| 2017/0060988 | A1 | 3/2017 | Kudo et al. |
| 2017/0091397 | A1 | 3/2017 | Shah |
| 2017/0103468 | A1 | 4/2017 | Orsini et al. |
| 2017/0116693 | A1 | 4/2017 | Rae et al. |
| 2017/0134158 | A1 | 5/2017 | Pasol et al. |
| 2017/0140145 | A1 | 5/2017 | Shah |
| 2017/0169358 | A1 | 6/2017 | Choi et al. |
| 2017/0220949 | A1 | 8/2017 | Feng et al. |
| 2017/0272342 | A1 | 9/2017 | Zessin et al. |
| 2017/0279774 | A1 | 9/2017 | Booz et al. |
| 2017/0289111 | A1 | 10/2017 | Voell et al. |
| 2017/0302663 | A1 | 10/2017 | Nainar et al. |
| 2018/0018590 | A1 | 1/2018 | Szeto et al. |
| 2018/0039667 | A1 | 2/2018 | Pierce et al. |
| 2018/0157688 | A1 | 6/2018 | Zessin et al. |
| 2018/0183768 | A1 | 6/2018 | Lobban et al. |
| 2018/0217905 | A1 | 8/2018 | Reza et al. |
| 2018/0247191 | A1* | 8/2018 | Katz .................. G06Q 20/0655 |
| 2018/0331897 | A1 | 11/2018 | Zhang et al. |
| 2019/0020629 | A1 | 1/2019 | Baird et al. |
| 2019/0042407 | A1 | 2/2019 | Gao et al. |
| 2019/0089716 | A1 | 3/2019 | Stocker |
| 2019/0138929 | A1 | 5/2019 | Wong et al. |
| 2019/0147532 | A1 | 5/2019 | Singh et al. |
| 2019/0182030 | A1 | 6/2019 | Jo |
| 2019/0182231 | A1 | 6/2019 | Harrer et al. |
| 2019/0236598 | A1 | 8/2019 | Padmanabhan |
| 2019/0287026 | A1 | 9/2019 | Calmon et al. |
| 2019/0295000 | A1 | 9/2019 | Candel et al. |
| 2019/0317934 | A1 | 10/2019 | Jentzsch et al. |
| 2019/0325432 | A1 | 10/2019 | Ow et al. |
| 2019/0332921 | A1 | 10/2019 | Rodriguez |
| 2019/0332955 | A1 | 10/2019 | Manamohan et al. |
| 2019/0332966 | A1 | 10/2019 | Gidney |
| 2019/0347540 | A1 | 11/2019 | Yim et al. |
| 2020/0042362 | A1 | 2/2020 | Cui et al. |
| 2020/0057920 | A1* | 2/2020 | Collins .................. G06N 20/00 |
| 2020/0193292 | A1 | 6/2020 | Weng et al. |
| 2020/0218940 | A1* | 7/2020 | Anglin ................ H04L 65/4025 |
| 2020/0244435 | A1 | 7/2020 | Shpurov et al. |
| 2020/0348662 | A1 | 11/2020 | Cella et al. |
| 2021/0134095 | A1* | 5/2021 | Milt ........................ A24F 40/65 |
| 2023/0041118 | A1 | 2/2023 | Imabayashi et al. |

FOREIGN PATENT DOCUMENTS

| | | |
|---|---|---|
| CN | 106445711 A | 2/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107665154 A | 2/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110472745 A | 11/2019 |
| CN | 110490305 A | 11/2019 |
| CN | 110490330 A | 11/2019 |
| CN | 105488675 B | 12/2019 |
| EP | 3564873 A1 | 11/2019 |
| WO | 2017/203093 A1 | 11/2017 |
| WO | WO-2018059939 A1 | 4/2018 |
| WO | 2018/130267 A1 | 7/2018 |
| WO | WO-2018191030 A1 | 10/2018 |

OTHER PUBLICATIONS

M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).

Search Report and Written Opinion received for PCT Application No. PCT/US2021/014932, dated May 13, 2021, 08 pages.

Bank for International Settlements, "Distributed ledger technology in payment, clearing and settlement", Committee on Payments and Market Infrastructures, Feb. 2017, 29 pages.

Ben Dickson, "The case for decentralized artificial intelligence", TechTalks, available online at <https://bdtechtalks.com/2018/01/10/decentralized-ai-blockchain/>, Jan. 10, 2018, 5 pages.

Bonawitz et al., "Practical Secure Aggregation for Privacy-Preserving Machine Learning", CCS'17, ACM, Oct. 30-Nov. 3, 2017, pp. 1175-1191.

Catherine Sturman, "OWKIN is set to use machine learning to augment medical and biology research", Healthcare Global, available online at <https://www.healthcareglobal.com/technology/owkin-

(56) References Cited

OTHER PUBLICATIONS set-use-machine-learning-augment-medical-and-biology-research>, Jun. 19, 2018, 8 pages.
Chen et al., "ALGORAND", Computer Science Cryptography and Security, May 26, 2017, pp. 1-75.
Extended European Search Report received for EP Patent Application No. 18177565.1, dated Nov. 30, 2018, 08 pages.
Extended European Search Report received for EP Patent Application No. 18177566.9, dated Dec. 13, 2018, 07 pages.
Extended European Search Report received for EP Patent Application No. 18183265.0, dated Feb. 4, 2019, 11 pages..
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.
Georgopoulos et al., "Distributed machine learning in networks by consensus", Neurocomputing, Elsevier, vol. 124, 2013, 11 pages.
Kurtulmus et al., "Trustless Machine Learning Contracts; Evaluating and Exchanging Machine Learning Models on the Ethereum Blockchain", Research Gate, Feb. 27, 2018, 11 pages.
Lei Shi, "The convergence of AI and IoT, are we there yet?", available online at <https://northstream.se/insights/blog/the-convergence-of-ai-and-iot-are-we-there-yet/>, Oct. 11, 2017, 11 pages.
Li et al., "Scaling Distributed Machine Learning with the Parameter Server", 11th USENIX Symposium on Operating Systems Design and Implementation, Oct. 6-8, 2014, 17 pages.
Mendis et al., "Blockchain as a Service: an Autonomous, Privacy Preserving, Decentralized Architecture for Deep Learning", Research Paper, Jul. 5, 2018, pp. 1-8.
Nakamoto et al., "Bitcoin: a Peer-to-Peer Electronic Cash System", Oct. 31, 2008, pp. 1-9.
Pop at al., "Blockchain Based Decentralized Management of Demand Response Programs in Smart Energy Grids", MDPI, Jan. 9, 2018, pp. 1-21.
Venkataraman et al., "Adopting blockchain for enterprise asset management (EAM)", IBM, available online at <https://developer.ibm.com/technologies/blockchain/tutorials/cl-adopting-blockchain-for-enterprise-asset-management-eam/>, Mar. 17, 2017, 15 pages.
Weng et al., "DeepChain: Auditable and Privacy-Preserving Deep Learning with Blockchain-based Incentive", Journal of Latex Class Files, vol. 14(8), Nov. 2019, pp. 1-18.
Zhang et al., "Stay Fresh: Speculative Synchronization for Fast Distributed Machine Learning", 2018 IEEE 38th International Conference on Distributed Computing Systems (ICDCS), 2018, 11 pages.
Abadi et al., "TensorFlow: a System for Large-Scale Machine Learning", 2th USENIX Symposium on Operating Systems Design and Implementation (OSDI '16), Nov. 2-4, 2016, 21 pages.
Ali et al., "Applications of Blockchains in the Internet of Things: a Comprehensive Survey", IEEE Communications Surveys & Tutorials, 2018, 42 pages.
Chen et al., "When Machine Learning Meets Blockchain: a Decentralized, Privacy-preserving and Secure Design", IEEE International Conference on Big Data (Big Data), 2018, pp. 1178-1187.
Kim et al., "On-Device Federated Learning via Blockchain and its Latency Analysis", Research Gate, Aug. 2018, 4 pages.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, dated Jun. 2, 2020, 15 pages.
Singla et al., "Machine Learning for Secure Device Personalization Using Blockchain", IEEE, Sep. 19, 2018, 7 pages.
Verbraeken et al., A Survey on Distributed Machine Learning, (Research Paper), ACM Computing Surveys, vol. 53, No. 2, Mar. 2020, pp. 1-33.
Acar et al., "A Survey on Homomorphic Encryption Schemes: Theory and Implementation", ACM Computing Surveys, vol. 51, No. 4, Article 79, Jul. 2018, pp. 79:1-79:35.
Bonawitz et al., "Practical Secure Aggregation for Privacy-Preserving Machine Learning", Cryptology ePrint Archive: Report 2017/281, 2017, 21 pages.
Kurakin et al., "Adversarial Examples in the Physical World", CoRR, abs/1607.02533, 2017, pp. 1-14.
Nedic et al., "Network Topology and Communication-Computation Tradeoffs in Decentralized Optimization", Jan. 15, 2018, 32 pages.
Shokri et al., "Membership Inference Attacks Against Machine Learning Models", CoRR, abs/1610.05820, 2017, 16 pages.
Yuan et al., "Privacy Preserving Back-Propagation Neural Network Learning Made Practical with Cloud Computing", IEEE Transactions on Parallel and Distributed Systems, 2013, vol. 25, pp. 1-11.
Search Report and Written Opinion received for PCT Application No. PCT/US2021/013394, dated Apr. 19, 2021, 08 pages.
"Decentralized Machine Learning White Paper", available online at <www.decentralizedml.com>, Dec. 31, 2017, 58 pages.
Diro et al., "Deep Learning: the Frontier for Distributed Attack Detention in Fog-to-Things Computing", IEEE Communications Magazine, Feb. 2018, , pp. 169-175.
Yuguang et al., "Review and Research for Consensus Mechanism of Block Chain", China Academic Journal Electronic Publishing House, Research Papers, vol. 4, No. 4, Apr. 2018, pp. 369-379. (English Abstract Only).
Xu et al., "HybridAlpha: an Efficient Approach for Privacy-Preserving Federated Learning", ACM, 2019, 11 pages.
Reisizadeh et al., "Robust and Communication-Efficient Collaborative Learning", Oct. 31, 2019, 33 pages.
Watanabe et al., "Blockchain contract: a complete consensus using blockchain," 2015 IEEE 4th Global Conference on Consumer Electronics (GCCE), 2015, pp. 577-578, doi: 10.1109/GCCE.2015.7398721. (Year: 2015).
Yang et al. "Federated Machine Learning: Concept and Applications." arXiv preprint arXiv:1902.04885 (2019). (Year 2019).
European Search Report and Search Opinion received for EP Application No. 21747157.2, dated Oct. 28, 2022, 5 pages.
Li et al., "DLBC: a Deep Learning-Based Consensus in Blockchains for Deep Learning Services", IEEE Transactions on Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMoN: a Decentralized Artificial Intelligence Model Network", Jul. 2019, 8 pages.
Castro et al, "Practical Byzantine Fault Tolerance", Proceedings of the Third Symposium on Operating Systems Design and Implementation, New Orleans, USA, Feb. 1999 (Year: 1999).
Chen et al, "On Security Analysis of Proof-of-Elapsed-Time (PoET)", in: Spirakis, P., Tsigas, P. (eds) Stabilization, Safety, and Security of Distributed Systems. SSS 2017. Lecture Notes in Computer Science( ), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).
Resizadeh, et al., "Quantized Decentralized Consensus Optimization"; 2018 IEEE Conference on Decision and Control (CDC) (Year: 2018).
Xu, R., et al., "HybridAlpha: an Efficient Approach for Privacy-Preserving Federated Learning", ACM, Nov. 11, 2019, pp. 11.
Zhu, et al., Blockchain-Based Privacy Preserving Deep Learning. in: Guo, F., Huang, X., Yung, M. (eds) Information Security and Cryptology. Inscrypt 2018. Lecture Notes in Computer Science( ), vol. 1144 (Year: 2018).
Castro et al, "Practical Byzantine Fault Tolerance", Proceedings of the Third Symposium on Operating Systems Design and Implementation, New Orleans, USA, Feb. 1999 (Year: 1999) (14 pages).
Chen et al, "On Security Analysis of Proof-of-Elapsed-Time (PoET)", in: Spirakis, P., Tsigas, P. (eds) Stabilization, Safety, and Security of Distributed Systems. SSS 2017. Lecture Notes in Computer Science( ), vol. 10616. Springer, Cham, https://doi.org/10.1007/978-3-319-69084-1_19 (Year: 2017) (16 pages).

(56) References Cited

OTHER PUBLICATIONS

Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018) (21 pages).

Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018) (28 pages).

Resizadeh, et. al., "Quantized Decentralized Consensus Optimization"; 2018 IEEE Conference on Decision and Control (CDC) (Year: 2018) (6 pages).

Zhu, et al., Blockchain-Based Privacy Preserving Deep Learning. in: Guo, F., Huang, X., Yung, M. (eds) Information Security and Cryptology. Inscrypt 2018. Lecture Notes in Computer Science( ), vol. 1144 (Year: 2018) (14 pages).

\* cited by examiner

SYSTEMS AND METHODS FOR MONETIZING DATA IN DECENTRALIZED MODEL BUILDING FOR MACHINE LEARNING USING A BLOCKCHAIN

CROSS REFERENCE TO RELATED APPLICATIONS

This application is related to co-pending and co-owned U.S. patent application Ser. No. 16/163,484, entitled "SYSTEM AND METHOD OF DECENTRALIZED MANAGEMENT OF MULTI-OWNER NODES USING BLOCKCHAIN," entitled "SECURE PARAMETER MERGING USING HOMOMORPHIC ENCRYPTION FOR SWARM LEARNING," both of which are incorporated herein by reference in their entirety.

DESCRIPTION OF THE RELATED ART

Geo-distributed, decentralized enterprise infrastructures or systems such as factory floors, clusters of geographically distributed servers, fleets of autonomous vehicles, Internet of Things (IoT) networks, and the like can be difficult to manage. Aside from being decentralized, these systems can be massive in scale, and heterogeneous in nature. It can be appreciated that managing such systems may present logistic challenges that are compounded when these infrastructures have or interact with devices (also referred to as "nodes") that operate outside of an enterprise network, e.g., are owned by another one or more users or entities.

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention.

Blockchain can refer to a tamper-proof, decentralized ledger that establishes a level of trust for the exchange of value without the use of intermediaries. A blockchain can be used to record and provide proof of any transaction on the blockchain, and is updated every time a transaction occurs.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1A:
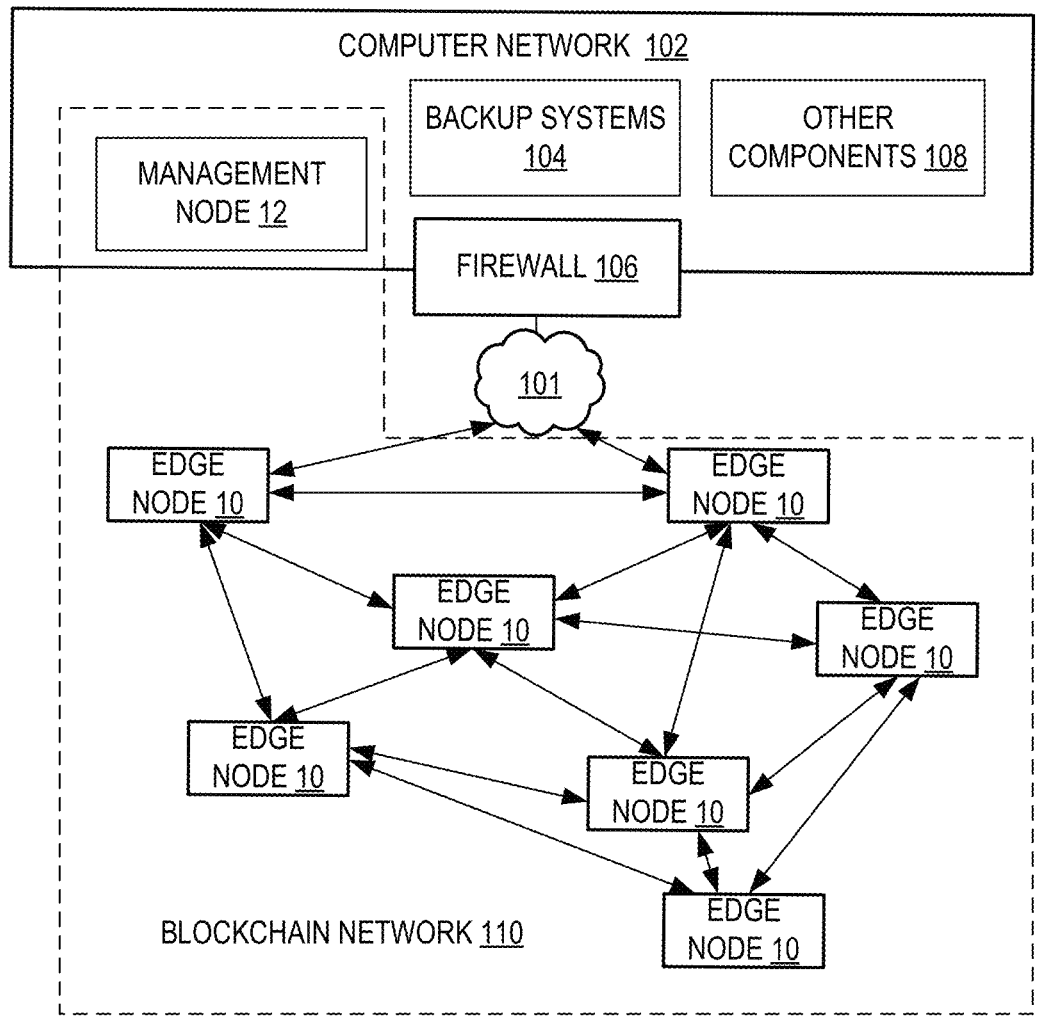
FIG. 1A illustrates an example of a system of decentralized management of device assets outside a computer network in accordance with an embodiment of the disclosed technology.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

Robust ML models are achieved by training the ML model using large amounts of data, making data a valuable asset. Distributed ML can refer to ML model building across multiple nodes using data locally available to each of the nodes, making distributed ML a natural and convenient mechanism for obtaining such large amounts of data. In distributed ML, local model parameters learned from each local model can be merged to derive a global model, where the resulting global model can be redistributed to all the nodes for another iteration, i.e., localized data trains the global model. This can be repeated until the desired level of accuracy with the global model is achieved.

However, privacy concerns and the current lack of accurate reward determination methods makes the sharing of such data a hurdle in achieving a robust ML model. For example, organizations are often hesitant to release any data they have collected for fear of running afoul of data privacy rules/regulations, leaking personal data, etc. Moreover, organizations willing to share data for the purposes of training a ML model may unscrupulously provide duplicate or redundant data so as to appear as though they are sharing more data than is actually being provided. Additionally, data quality can impact the training of an ML model, i.e., and the rewards an organization receives for sharing its collected data should be commensurate with the quality of the data it shares.

Accordingly, systems and methods are provided for using a blockchain as a distributed ledger that contains state information of the nodes belonging to the blockchain, and which are sharing their data. Smart contracts may handle distributed control and coordination in various embodiments. It should be noted that swarm learning, as used herein, can refer to distributed or decentralized ML built atop or overlaid on blockchain technology.

Monetization of data in accordance with various embodiments may involve various stages or phases, including, for example, a contribution phase, a reward claim phase, a verification phase, a reward calculation phase, a reward signoff phase, and a reward distribution phase.

In accordance with a contribution phase, a management node may send or otherwise instruct edge nodes in a network to encrypt (using a symmetric key) the raw data they have extracted from a model during training, after which each edge node creates a secure cryptographic hash of each encrypted raw data record. This aids in addressing the data privacy issue, and also reduces file sizes. Each edge node may then run a deduplication operation to ensure duplicate hashes/data is stored. This can combat the redundant data issue. Each edge node may be instructed to determine its own status and perform a check-in operation to share the hashed data. Based on the shared hash data, a Merkle tree (binary hash tree where every leaf node is a hash of a data block) is built, and a Merkle root is obtained. The Merkle root can be registered into the blockchain along with parameters that an edge node has generated. This can be repeated each time data is shared by an edge node and as an ML model is trained.

Once the ML model achieves the desired accuracy, the edge nodes can make a claim for a reward based on their contribution. For example, the management node may receive from each edge node, a claim regarding the height of the Merkle tree their data built along with the top-most Merkle root in its local data store. Given the previously described deduplication, the claimed Merkle tree height should be accurate.

Some group of edge nodes (can be pre-specified) may challenge another edge node regarding its purported contribution. In this phase, a challenging edge node may pick one or more Merkle roots registered in the blockchain and request a corresponding Merkle proof, e.g., if a registered Merkle root is "K" high, the challenged edge node should send K hashes to the challenging edge node. Because only hashes are exchanged, data privacy is still maintained. After receiving some threshold number of approvals from challenging edge nodes, the challenged edge node's reward claim can be cleared for distribution.

When all challenges have been completed, all edge nodes approved to receive a reward can calculate the number of points it has accumulated in accordance with the height of the Merkle tree(s) it has built. Each node may also calculate the number of points every other edge node has accumulated. Their own point count can be registered in the blockchain for verification. Some group of other edge nodes can verify the registered point count, and using digital signatures, may complete this verification process. All edge nodes whose claim(s) have been verified can request their percentage share of the reward being offered for building/training that ML model.

As noted above, embodiments of the technology disclosed herein, referred to as swarm learning, build on distributed ML and blockchain. Distributed ML, as alluded to above, can be leveraged for its ability to train a common model across multiple nodes (global model) using data (or a subset(s) of data) at each node of the network. The blockchain aspect allows for decentralized control and scalability, while also providing the requisite fault-tolerance to enable embodiments to work beyond the single enterprise/entity context. Moreover, the blockchain aspect introduces a tamper-proof/resistant cryptocurrency, with which participating nodes or data sources can use to monetize their data contribution(s) to training the global model.

The blockchain framework will be described first. A controller framework can be provided that allows participant nodes in a network to interact with each other using blockchain technology. The use of blockchain technology for these interactions may be implemented to ensure that the interactions are secured, non-repudiated, sequenced and permissioned. Embodiments may also be implemented to use a blockchain to allow participants to evolve a consensus protocol for one or more aspects of the distributed ML portion of the swarm learning framework. For example, consensus protocols can be agreed by all participants (nodes) and implemented as smart contracts in the system using blockchain technology.

In another embodiment, operations may be implemented to provide provenance tracking across a heterogeneous distributed storage platform to track which nodes conducted which operations on which systems. In some applications, metadata operations may be routed via a blockchain and storage devices or other network entities can be configured to accept operations only via the blockchain interface. For example, storage devices on the network can be commanded to allow metadata operations only via the blockchain interface. In this way, factors such as identity, authorization, provenance, non-repudiation and security can be provided for operations on nodes managed in this way.

Accordingly, embodiments may be implemented in which the management operation becomes decentralized and the system no longer requires a central entity to enforce policies. Particularly, in some applications, the system may be implemented with no central management server, and may instead use only a management node or nodes to input management instructions onto the blockchain using blockchain transactions. Once a change is approved, a device may implement the change and the blockchain can be used to provide a clear record of state of the system as it evolves over time. Because embodiments may be implemented in a peer-to-peer environment without a central management entity, the enterprise is scalable without limitations on how many nodes a central management entity might be able to address.

Decentralized management of assets operating outside a computer network (also referred to as edge nodes) from within the computer network may be achieved. The edge nodes may include enterprise devices and the computer network may include the enterprise's network. Network traffic to and from the computer network may pass through a firewall around the computer network. A management server (also referred to as a management node) may operate within the firewall to manage the configuration of edge nodes operating outside the firewall using blockchain technology. The management node and the edge nodes may be part of a blockchain network.

The management node may act as a full node that stores a complete or at least updated copy of a distributed ledger. The management node may also act as a miner that has permission to write blocks to the distributed ledger. The management node may mine management operations in the form of change requests into the distributed ledger. The management operations may include, without limitation, removal of an edge node from the network (such as resulting from non-compliance of the edge node to set protocols followed by the network). Management operations may also include the addition of a new asset (edge node) in to the network and configuring of that new asset, as well as proposal of a new software update that will be installed on all edge nodes. Further still, management operations can include the execution of a status check on some or all of the edge nodes, and/or other operations that can be remotely ordered and applied locally at an edge node.

Updates to the distributed ledger are propagated to all of the nodes (such as the edge nodes and the management node) according to a blockchain specification, including via peer-to-peer sharing. This permits the management node to communicate change requests to edge nodes through the distributed ledger in a secure and immutable way. This also permits generation of a historic and current record of the management operations. As such, a historic and current state of the system may be stored and retrieved from the distributed ledger.

Each of the edge nodes may act as a full node that stores a complete or at least updated copy of the distributed ledger. In some instances, none of the edge nodes have permission to write to the distributed ledger and therefore cannot issue change requests to other edge nodes. An edge node may read its local copy of the distributed ledger to obtain the change requests. Upon receipt of a change request, the edge node may implement the change request and update its state to indicate the change request has been implemented. This state transition may be broadcast to other nodes, such as in the form of a blockchain transaction. The management node may collect transactions not yet written to the distributed ledger and write them to the distributed ledger, thereby ensuring an immutable and distributed record of change requests and state transitions. As such, the distributed ledger may record the current and historic configuration of the edge nodes.

Use of the foregoing architecture ensures management operations are secured, non-repudiated, sequenced, and permissioned. Management operations become partially "decentralized"; as a data center within a computer network serves as a management node that enforces policies and electronically proposes changes. Once a change is mined into the distributed ledger, each of the systems implement the change and there is a clear record and undisputable record of state of the system as it progressed and evolved over time. For example, an edge node can synchronize its copy of the distributed ledger from other edge nodes (or from the management node) to obtain the current, valid, and immutable configuration of the system. The foregoing permits system scaling, as any participant of the system may access current (and historic) state information from the distributed ledger. New edge nodes may be added by providing the new node with a copy of the distributed ledger. A new edge node may then configure itself according to the current state information from its copy of the distributed ledger or otherwise obtain software or other updates consistent with the current state information.

FIG. 1A illustrates an example of a system 100 of decentralized management of device assets outside a computer network 102, according to an implementation of the invention. System 100 may include a blockchain network 110. The blockchain network 110 may include a plurality of nodes that are connected to one another using one or more connection protocols, including a peer-to-peer connection protocol. The nodes of the blockchain network 110 may include a management node 12 and edge nodes 10. The particular number of, configuration of, and connections between the edge nodes 10 may vary. As such, the arrangement of the edge nodes 10 shown in FIG. 1A is for illustrative purposes only.

The management node 12 is part of and operates within a firewall 106 of computer network 102 and the edge nodes 10 operate outside the firewall. As alluded to above, and as will be described in greater detail below, such edge nodes 10 may contribute data that can be used to train a local instance of a global ML model in a swarm learning context. The computer network 102 may also include one or more backup systems 104 that provides failover protection for the management node 12 and/or other components 108 operating within the computer network. The components of the computer network 102 may communicate with one another via a local area network ("LAN"). The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. The network 101 may include a wide area network ("WAN") that connects devices outside the firewall 106.

Examples of further details of a management node 12 will now be described with reference to FIG. 1B. The management node 12 may include one or more processors 20 (also interchangeably referred to herein as processors 20, processor(s) 20, or processor 20 for convenience), one or more storage devices 40, and/or other components. The processor 20 may be programmed by one or more computer program instructions. For example, the processor 20 may be programmed to execute a management user interface 22 (illustrated as "management user interface 22"), a controller 24, a blockchain interface layer 30, and/or other instructions to perform various operations, each of which are described in greater detail herein. As used herein, for convenience, the various instructions will be described as performing an operation, when, in fact, the various instructions program the processors 20 (and therefore management node 12) to perform the operation.

The management user interface 22 may provide an interface, such as a graphical user interface, a command line interface, and/or other type of interface configured to receive management option inputs. For instance, a user such as a system administrator may use the management user interface 22 to input management operations to be conducted on one or more of the edge nodes 10 of the blockchain network 110, or to input an edge node to be added. In this manner, the user may manage edge nodes 10 based on change requests originating from within the computer network 102.

The controller 24 may obtain management operations to be performed and may communicate them to the relevant edge nodes 10. The management operations may be obtained from the management user interface 22 and/or a global policy 48. Controller 24 may communicate the management operations using the blockchain interface layer 30. For example, the controller 24 may write the management operations into a blockchain transaction that is broadcast to the edge nodes 10. The blockchain transaction may be broadcast using a multicast protocol to several or all edge nodes 10. In some instances, the blockchain transaction may be broadcast using peer-to-peer networking in which the management node 12 acts as a peer to broadcast the transaction to at least one other peer (in this case, an edge node 10), which broadcasts the transaction to other peers and so on. In some implementations, the controller 24 may wait until a blockchain transaction is signed by an edge node 10 as described herein before writing the transaction to a block (also referred to herein as a "ledger block") of the distributed ledger 42. In these implementations, the edge nodes 10 may obtain management operations directly from the broadcasted transaction. In other implementations, the controller 24 may write the transaction to a block of the distributed ledger 42. In these implementations, the edge nodes 10 may obtain management operations by obtaining the current (in other words latest) block that references transactions having management operations.

In whichever manner the controller 24 broadcasts the management operations to edge nodes 10 using the blockchain interface layer 30, the controller may do so to in a manner that is directed all edge nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more edge nodes 10 to receive a management operation. In these implementations, the controller 24 may generate a blockchain transaction and/or a block on the distributed ledger 42 directed to the targeted edge node(s) 10. For instance, the controller 24 may encode an identifier of the edge node 10 that is targeted. Alternatively or additionally, the controller 24 may encode a device type that targets certain types of edge nodes 10 that should perform management operations. Still other examples include locations that should be targeted such that edge nodes in certain geolocations are targeted. The smart contracts 44 may include rules, which each edge node 10 follows, that direct the nodes to inspect transactions and/or blocks to determine whether it should apply a management operation contained in the transaction and/or block. In some implementations, the controller 24 may encrypt the management operation to be performed with a target edge node's 10 public key such that only the target edge node can decrypt the management operation with its private key.

In some instances, certain management operations may be executed periodically without user intervention. For example, controller 24 may execute a daemon or other process that periodically causes a status check from all edges nodes 10 to be executed. This daemon may periodically generate relevant change requests, which are issued to the edge nodes 10—and tracked via—the distributed ledger 42.

In an implementation, the controller 24 may enforce global policy 48 by ensuring that the state of the network complies with the global policy. For instance, the controller 24 may periodically obtain the current system state from the distributed ledger 42. As noted elsewhere, state transitions of the edge nodes 10 may be recorded on the distributed ledger 42. Alternatively or additionally, the result of status checks may be written to the distributed ledger 42, indicating the current state of the system. The controller 24 may compare the current system state (such as state of the blockchain network 110) with the global policy 48, which may specify a desired state of the system. The desired state may include a macro state of the system as a whole and/or a micro-state of any individual or group of edge nodes. Any discrepancies may be noted and an edge node 10 in non-compliance may be targeted for executing a management operation that will resolve the non-compliance. In some instances, the smart contracts 44 and/or global policy 48 may encode rules that specify when a non-complying edge node 10 should be taken offline. For instance, the rules may specify an edge node 10 that continues to be in non-compliance after N number of blocks have been written to the distributed ledger 42 should be taken offline. Other parameters may specify such removal as well. The foregoing may ensure recurring policy enforcement and compliance using the blockchain interface layer 30.

In one embodiment, in connection with certain types of management operations, the controller 24 may make available files for download. For instance, operating system images, software updates, new software, and/or other downloadable files or data may be made available for edge nodes 10 to download in connection with a management operation. As will be described below, in some embodiments, downloadable files may include files containing particular encryption keys, merged parameters, etc. This may ensure that the distributed ledger 42 itself does not have to store such files or data but stores an immutable record of current files or data that should be used (as well as historic listing of such files or data).

The blockchain interface layer 30 may be used to interface with the distributed ledger 42 in accordance with the smart contracts 44. The blockchain interface layer 30 is described with reference to FIG. 1D below.

The storage devices 40 may store a distributed ledger 42, smart contracts 44, node keys 46, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by the management node 12, and/or other actions that an edge node 10 or management node 12 may take for decentralized management. In some embodiments, such rules may specify when rewards can be distributed, how many peers comprise a quorum, coordination of verification amongst peer nodes, etc.

The node keys 46 may store public encryption keys of edge nodes 10 in association with their identities (such as Internet Protocol or other addresses and/or identifying information). In this manner, in some implementations, change requests may be targeted to specific edge nodes 10 and encrypted using the target edge node's public key.

The global policy 48 may store a security or other policy for the system. The global policy 48 may include, for example, network configuration settings, security configuration settings, operating system settings, application settings, policy rules, and/or other policy information for devices managed by the management node 12.

Examples of further details of an edge node 10 will now be described with reference to FIG. 1C. An edge node 10 may be a fixed or mobile device. While only one of the edge nodes 10 is illustrated in detail in the figures, each of the edge nodes 10 may be configured in the manner illustrated. The edges nodes 10 may communicate with one another in a peer-to-peer manner. The edge nodes 10 may each include one or more processors 50 (also interchangeably referred to herein as processors 50, processor(s) 50, or processor 50 for convenience), one or more storage devices 70, and/or other components.

The processor 50 may be programmed by one or more computer program instructions. For example, the processor 50 may be programmed to execute a blockchain agent 52, a configuration manager 54, a blockchain interface layer 30, and/or other instructions to perform various operations, each of which are described in greater detail herein. As used herein, for convenience, the various instructions will be described as performing an operation, when, in fact, the various instructions program the processors 50 (and therefore edge node 10) to perform the operation.

The blockchain agent 52 may use the blockchain interface layer 30 to communicate with other edge nodes 10 and/or management node 12. The blockchain interface layer 30, described with reference to FIG. 4, may operate in the same manner at management node 12 and edge node 10 to communicate with the blockchain network (other than being able to write to the distributed ledger 42). For example, the blockchain agent 52 may obtain an updated copy of the distributed ledger 42 from one or more other edge nodes 10 and/or management node 12. The blockchain agent 52 may also obtain management operations from the distributed ledger 42 written by the management node 12. In this manner, the management node 12 may communicate management operations to be performed at an edge node 10 through the distributed ledger 42.

The configuration manager 54 may obtain one or more management operations from the blockchain agent 52. The configuration manager 54 may apply the one or more management operations to the edge node 10. In some instances, the configuration manager 54 may apply the management operations without a determination of whether to do so. In other instances, the configuration manager 54 may consult one or more local policies to ensure that the edge node 10 can comply with the one or more management operations. The local policies may be encoded by the smart contracts 44. Alternatively or additionally, some local policies may be stored in a local policy 78, which is not necessarily shared with other edge nodes 10. In other words local policy 78 may be defined specifically at an edge node at which it is stored.

Once the configuration manager 54 has acted on the one or more management operations (whether by applying them or not), the blockchain agent 52 may broadcast its state to other nodes of the blockchain network 110. For example, the blockchain agent 52 may generate and transmit a blockchain transaction that indicates the state of the edge node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the management operation that was (or was not) applied.

For implementations in which management operations are targeted to an edge node 10 and encrypted using the targeted edge node 10's public key 72, the blockchain agent 52 may decrypt the management operations using the edge node 10's private key 74. In some implementations, the blockchain agent 52 may digitally sign a blockchain transaction from the management node 12 that includes the management operation. For instance, the management node 12 may generate a transaction directed to the edge node 10 and sign the transaction using the management node 12's public key.

The management node 12 may then write the signed transaction to the distributed ledger 42 to create an immutable record of the management operation and state change of the targeted edge node. In this manner, the transaction may be securely proven to have been executed by the edge node 10. It should be noted that the edge node 10 need not specifically be targeted in order to sign the transaction so as to create a record of the edge node's 10 state in a transaction and therefore block.

Upon receipt of a transaction, the edge node 10 apply the management operation and indicate that it has successfully done so by signing the transaction with the edge node's private key. The management node 12 may write this transaction into the distributed ledger 42, creating a secure, immutable record that proves that the edge node received and applied the management operation. In some implementations, an edge node 10 may be associated with a series of transactions such that each transaction may refer to a previous transaction hash. The transactions may be written to the distributed ledger 42 by the management node 12, creating an immutable and historic record of transactions for a given edge node 10.

In an implementation, the configuration manager 54 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 54 may determine whether any current management operations (as defined by the latest block encoding such operations), including global ones and those specifically targeted to the edge node 10. If so, the configuration manager 54 may determine whether they should have been but were not implemented. If not, the configuration manager 54 may implement the management operations. In this manner, the edge nodes 10 may self-enforce the current management operations (as defined by the current system state).

The storage devices 70 may store an edge node's copy of the distributed ledger 42, the edge node's copy of smart contracts 44, the edge node's public key 72, the edge node's private key 74, and/or other data.

Figure 1C:
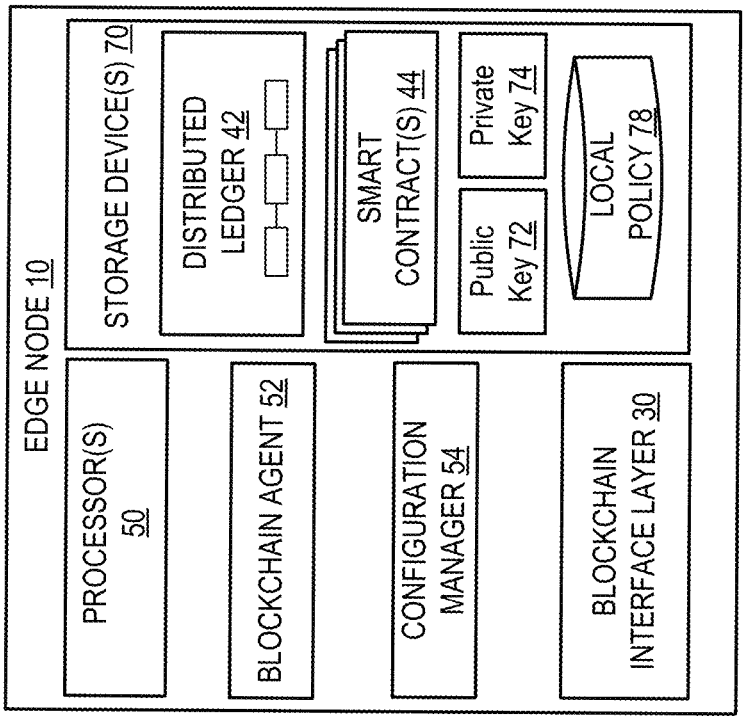
FIG. 1C illustrates an example of an edge node in a distributed blockchain network for decentralized management of device assets outside a computer network in accordance with an embodiment of the disclosed technology.
Figure 1B:
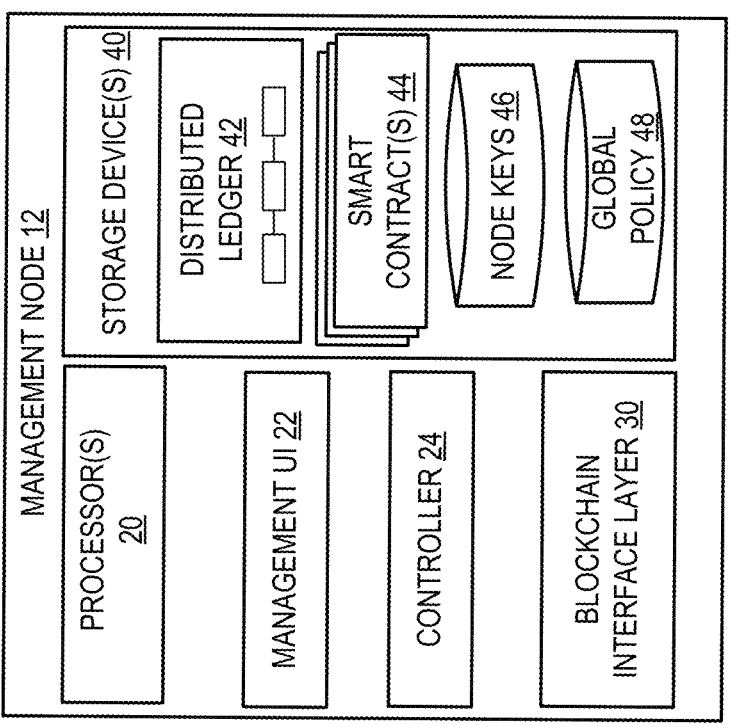
FIG. 1B illustrates an example of a management node in a distributed blockchain network for decentralized management of device assets outside a computer network in accordance with an embodiment of the disclosed technology.
Figure 1D:
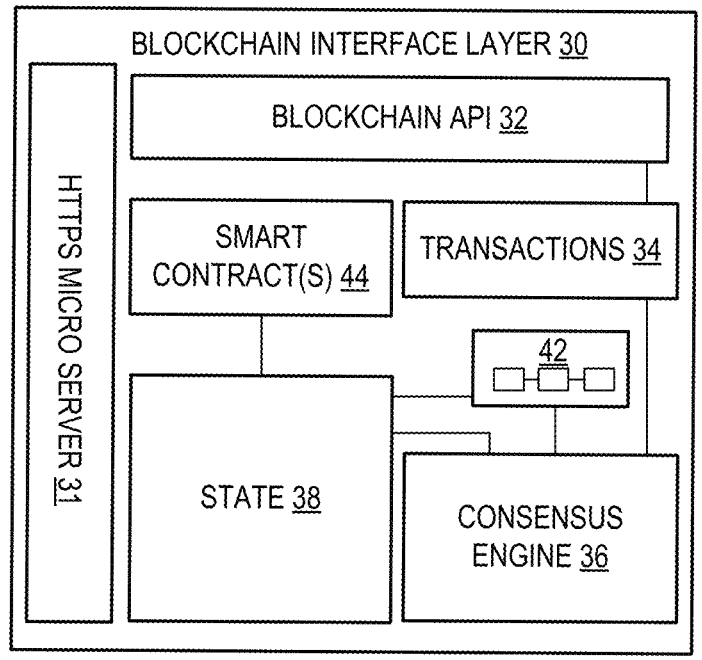
FIG. 1D illustrates an example of a blockchain interface layer for decentralized management of device assets outside a computer network in accordance with an embodiment of the disclosed technology.

Reference will now be made to FIG. 1D, which illustrates an example of the blockchain interface layer 30. Each of the edge nodes 10 and the management node 12 may implement the blockchain interface layer 30, except that the edge nodes 10 may not have permission to write to the distributed ledger 42. The blockchain interface layer 30 may include a messaging interface used to communicate with the blockchain network 110. The messaging interface may be configured as a Secure Hypertext Transmission Protocol ("HTTPS") microserver 31. Other types of messaging interfaces may be used as well. The blockchain interface layer 30 may use a blockchain API 32 to make calls for blockchain functions based on a blockchain specification. Examples of blockchain functions include, but are not limited to, reading and writing blockchain transactions 34 and reading and writing blockchain blocks to the distributed ledger 42. One example of a blockchain specification is the Ethereum specification. Other blockchain specifications may be used as well. Consensus engine 36 may include functions that make consensus decisions, such as whether to enroll a node to participate in decentralized management of the edge nodes. The state of a node 10 can be reflected by state 38.

Although illustrated in FIGS. 1B and 1C as a single component, a management node 12 or edge node 10, respectively, may include a plurality of individual components (such as computer devices) each programmed with at least some of the functions described herein. The one or more processors 20 or 50 may each include one or more physical processors that are programmed by computer program instructions. The various instructions described herein are provided for illustrative purposes. Other configurations and numbers of instructions may be used, so long as the processor(s) 20 or 50 are programmed to perform the functions described herein.

Furthermore, it should be appreciated that although the various functions are illustrated in FIGS. 1B and 1C as being co-located within a single processing unit, in implementations in which processor(s) 20 or 50 includes multiple processing units, one or more instructions may be executed remotely from the other instructions.

The various instructions for performing various functions described herein may be stored in a storage device 40 or 70, which may comprise random access memory (RAM), read only memory (ROM), and/or other memory. Storage device 40 or 70 may store the computer program instructions (such as the aforementioned instructions) to be executed by processor 20 or 50, respectively, as well as data that may be manipulated by processor 20 or 50. Storage device 40 or 70 may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40 or 70. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The edge nodes 10 and management node 12 illustrated in FIGS. 1C and 1B, respectively, may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other figures, different numbers of entities than those depicted may be used. Furthermore, according to various implementations, the components described herein may be implemented in hardware and/or software that configure hardware.

Swarm learning can involve various stages or phases of operation including, but not limited to: initialization and onboarding; installation and configuration; and integration and training. Initialization and onboarding can refer to a process (that can be an offline process) that involves multiple entities interested in Swarm-based ML to come together and formulate the operational and legal requirements of the decentralized system. This includes aspects such as data (parameter) sharing agreements, arrangements to ensure node visibility across organizational boundaries of the entities, and a consensus on the expected outcomes from the model training process. Values of configurable parameters provided by a swarm learning network, such as the peer-discovery nodes supplied during boot up and the synchronization frequency among nodes, are also finalized at this stage. Finally, the common (global) model to be trained and the reward system (if applicable) can be agreed upon.

Once the initialization and onboarding phase is complete, all participants (edge nodes 10, for example) may download and install a swarm learning platform/application onto their respective machines, i.e., nodes. The swarm learning platform may then boot up, and each node's connection to the swarm learning/swarm-based blockchain network can be initiated. As used herein, the term swarm learning platform can refer to a blockchain overlay on an underlying network of connections between nodes. The boot up process can be an ordered process in which the set of nodes designated as peer-discovery nodes (during the initialization phase) are booted up first, followed by the rest of the nodes in the swarm learning network.

With regard to the integration and training phase, the swarm learning platform can provide a set of APIs that enable fast integration with multiple frameworks. These APIs can be incorporated into an existing code base for the swarm learning platform to quickly transform a stand-alone ML node into a swarm learning participant. It should be understood that participant and node may be used interchangeably in describing various embodiments.

Figure 2A:
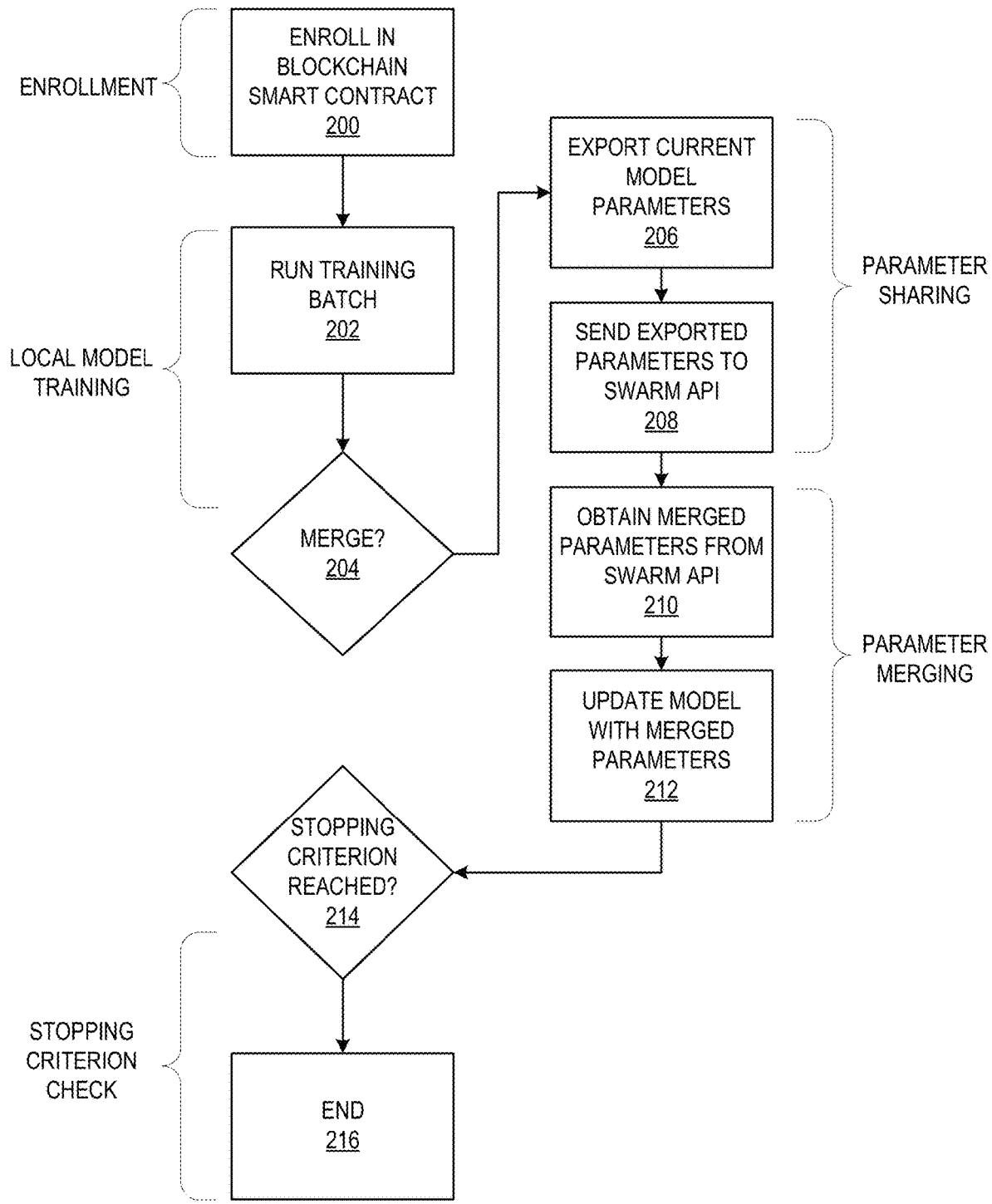
FIG. 2A illustrates an example swarm learning architecture in accordance with an embodiment of the disclosed technology.

At a high level, model training in accordance with various embodiments may be described in terms of enrollment, local model training, parameter sharing, parameter merging, and stopping criterion check. FIG. 2A illustrates operations that can be performed by the swarm learning platform in accordance with one embodiment. At 200, enrollment occurs. That is, each node in the swarm learning network may enroll or register itself in a swarm learning contract. In one embodiment, this can be a one-time process. In other embodiments, enrollment or registration may be performed after some time as a type of verification process. Each node can subsequently record its relevant attributes in the swarm learning contract, e.g., the uniform resource locator (URL) from which its own set of trained parameters can be downloaded by other nodes.

At 202, local model training occurs, where each node proceeds to train a local copy of the global or common model in an iterative fashion over multiple rounds that can be referred to as epochs. During each epoch, each node trains its local model using one or more data batches for some given number of iterations. A check to determine if parameters can be merged may be performed at 204. The check can determine if the threshold number of iterations has been reached and/or whether a threshold number of nodes are ready to share their respective parameters. These thresholds can be specified during the initialization phase.

After the threshold number of iterations has been reached, the parameter values of each node are exported to a file, which can then be uploaded to a shared file system for other nodes to access. Each node may signal the other nodes that it is ready to share its parameters.

Once parameter sharing commences, current model parameters may be exported at 206 and the exported parameters can be sent to a swarm learning application programming interface (API) (described in greater detail below) at 208. The parameter sharing phase can begin with the election of a merge or epoch leader, whose role is to merge the parameters derived after local training on the common model at each of the nodes. This election of a merge or epoch leader can occur after each epoch. While it is possible to elect a node to act as the merge leader across multiple epochs, electing a merge leader after each epoch helps ensure privacy by changing which node has the public key. Upon selection of one of the nodes of the swarm learning network to be the merge leader, the URL information of each participant or node can be used to download the parameter files from each node. In one embodiment, a star topology can be used, where a single merge leader performs the merge. Other topologies, such as a k-way merge, where the merge is carried out by a set of nodes may also be used.

The merge leader may then merge the downloaded parameter files (from each swarm learning network node). Appropriate merge mechanisms or algorithms may be used, e.g., one or more of mean merging, weighted mean merging, median merging, etc. The merge leader may combine the parameter values from all of the nodes to create a new file with the merged parameters, and signals to the other nodes that a new file is available. At 210, each node may obtain the merged parameters (represented in the new file) from the merge leader via the swarm API. At 212, each node may update its local version of the common model with the merged parameters.

At 214, a check can be performed to determine if a stopping criterion has been reached. That is, each of the nodes evaluate the model with the updated parameter values using their local data to calculate various validation metrics. The values obtained from this operation are shared using a smart contract state variable. As each node completes this step, it signals to the swarm learning network that the update and validation step is complete. In the interim, the merge leader may keep checking for an update complete signal from each node. When it discovers that all merge participants have signaled completion, the merge leader merges the local validation metric numbers to calculate global metric numbers. This updating of the model can be thought of as a synchronization step. If the policy decided during initialization supports monetization during model building, the rewards corresponding to the contributions by each of the participants are calculated and dispensed at this point. Afterwards, the current state of the swarm learning network is compared against a stopping criterion, and if it is found to be met, the swarm learning process ends. Otherwise, the steps of local model training, parameter sharing, parameter merging, and stopping criterion check are repeated until the criterion is fulfilled.

Figure 2B:
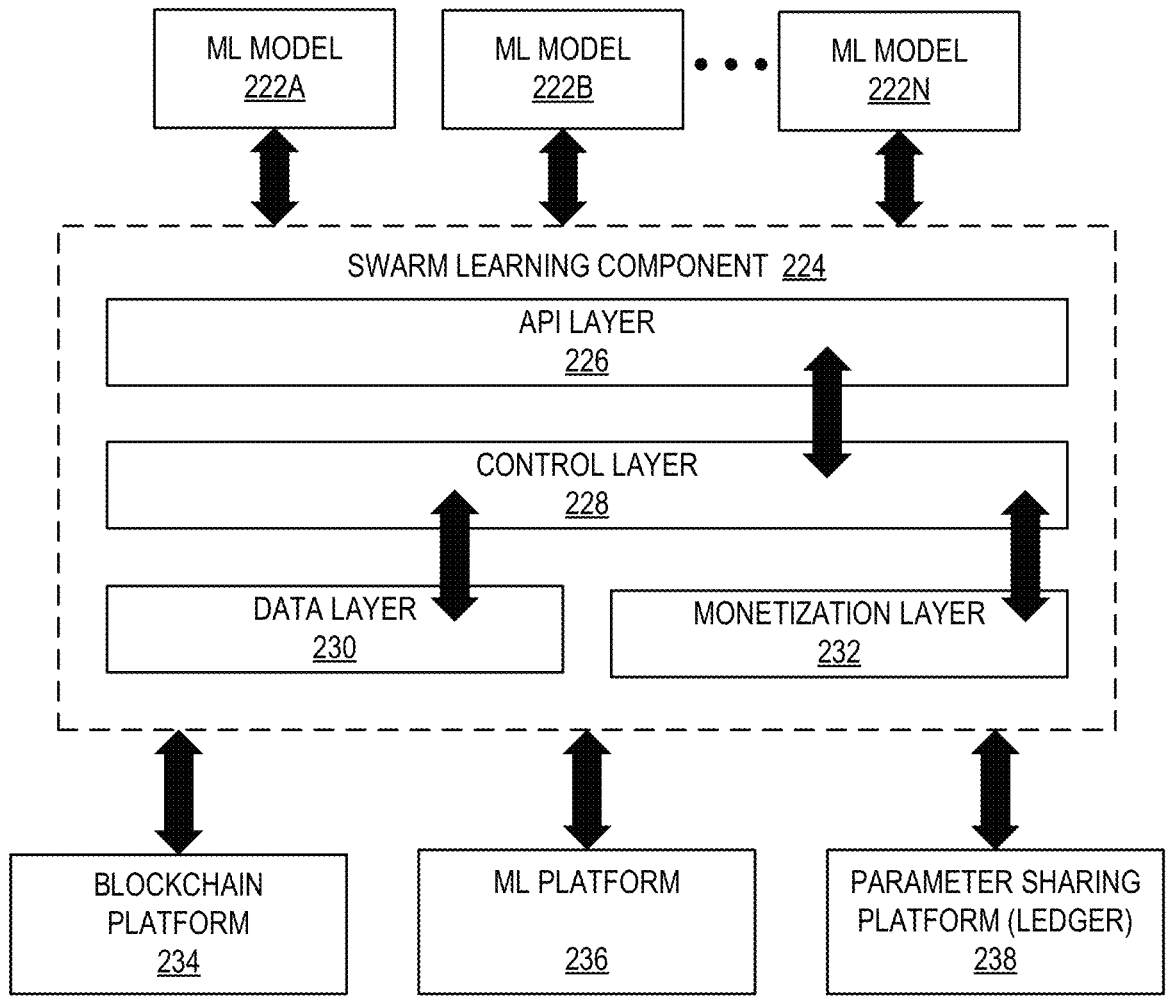
FIG. 2B illustrates example stages and operational flow of swarm learning in accordance with an embodiment of the disclosed technology.

FIG. 2B illustrates an example swarm learning architecture 220. This swarm learning architecture 220 may include local ML models 222A-222N at each node (ML models 1, 2, . . . N). These local ML models 222A-222N may be maintained and trained at nodes making up the swarm learning network, e.g., edge nodes 10, described above that make up blockchain network 110. The swarm learning architecture 220 may also include a swarm learning component 224 which may include an API layer 226, a control layer 228, a data layer 230, and a monetization layer 232. The swarm learning component 224 may operate (as noted above) in a blockchain context to ensure data privacy where a blockchain platform 234 operates on top of a ML platform 236 (that is distributed amongst nodes of a swarm learning network). The sharing of parameters can be performed using a blockchain ledger 238, which may be an embodiment of distributed ledger 42. It should be noted the components or elements of swarm learning architecture 220 can be modular so that the technologies used in implementing them can be replaced, adjusted, adapted, etc. based on requirements. The entire framework is designed to run on both commodity and high-end machines, supporting a heterogeneous set of infrastructure in the swarm learning network. It can be deployed within and across data centers, and has built-in support for a fault-tolerant network, where nodes can exit and reenter the swarm learning network dynamically without derailing or stalling the model building process.

Swarm learning, in one embodiment, can be implemented as an API library 226 available for multiple popular frameworks such as TensorFlow, Keras, and the like. These APIs provide an interface that is similar to the training APIs in the native frameworks familiar to data scientists. Calling these APIs automatically inserts the required "hooks" for swarm learning so that nodes seamlessly exchange parameters at the end of each model training epoch, and subsequently continue the training after resetting the local models to the globally merged parameters.

Responsibility for keeping the swarm learning network in a globally consistent state lies with the control layer 228, which is implemented using blockchain technology. The control layer 228 ensures that all operations and the corresponding state transitions are performed in an atomic manner. Both state and supported operations are encapsulated in a blockchain smart contract. The state (38 of FIG. 1D) comprises information such as the current epoch, the current members or participants of the swarm learning network, along with their IP addresses and ports, and the URIs for parameter files. The set of supported operations includes logic to elect a merge leader of the swarm learning network toward the end of each epoch, fault-tolerance, and self-healing mechanisms, along with signaling among nodes for commencement and completion of various phases.

Data layer 230 controls the reliable and secure sharing of model parameters across the swarm learning network. Like control layer 228, data layer 230 is able to support different file-sharing mechanisms, such as hypertext transfer protocol secure (HTTPS) over transport layer security (TLS), interplanetary file system (IPFS), and so on. Data layer 230 may be controlled through the supported operations invoked by control layer 228, where information about this layer may also be maintained.

Monetization layer 232 meters data usage and participant contribution (of data) during the model training process to calculate (appropriate) monetary rewards, which can be dispensed at the end of model training. It may rely on a blockchain smart contract as well to keep track of participant contributions, and the built-in cryptocurrency framework to transfer rewards to participants in an automated fashion.

As noted above, accurately determining the value of data contributions in the context of swarm learning allows for improved monetization of data. Thus, various embodiments are directed to determining the amount of unique data points contributed by each peer, participant, or node (any of which can refer to an embodiment of an edge node 10), as well as sharing an overall reward amongst such participants through peer verification.

Figure 3A:
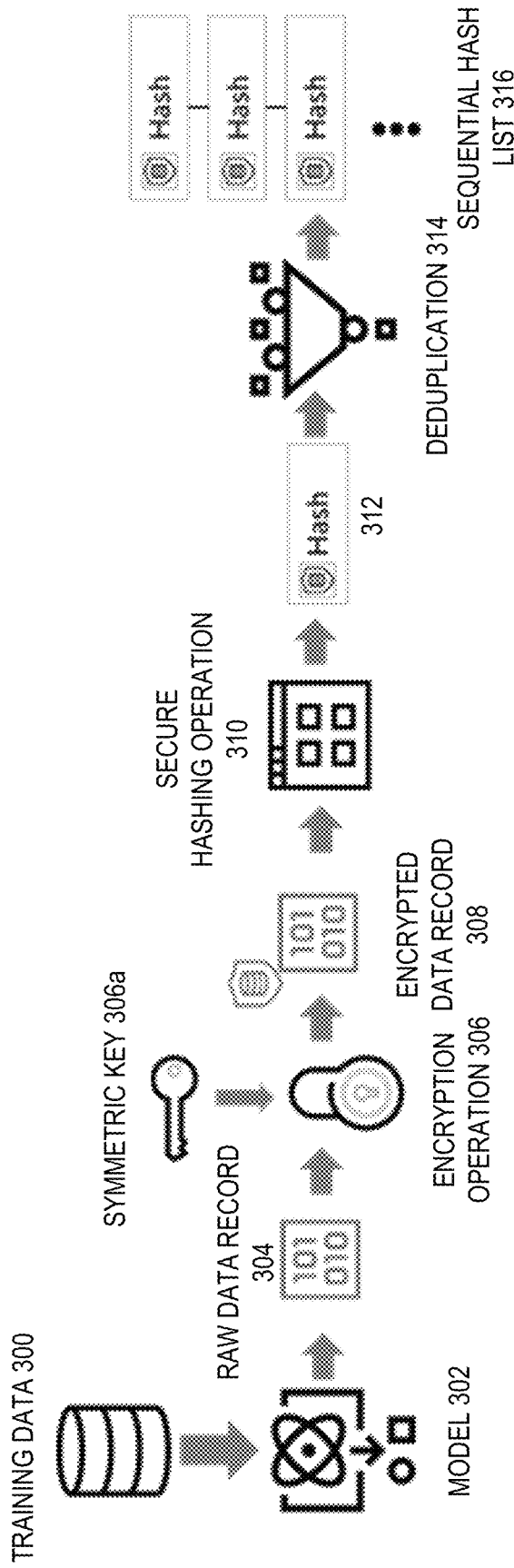
FIG. 3A illustrates example operations performed by a node as part of a contribution phase during swarm learning in accordance with one embodiment of the disclosed technology.

FIG. 3A illustrates example operations of the aforementioned contribution phase, where each node encrypts a raw data record extracted from the model during training using a symmetric key, e.g., from the input layer of the model to ensure what is used by the model is what is accounted for when considering monetization rewards. Raw data/raw data records should not be confused with model parameters. That is, a local instance of a common, global ML model, i.e., model 302 may be trained with local training data 300 at a node, e.g., an embodiment of edge node 10 of FIG. 1A. From training model 302, a raw data record 304 is extracted from model 302 during training. Using a symmetric key 306a, the raw data record 304 can be encrypted via an encryption operation 306, resulting in an encrypted data record 308. The use of a symmetric key 306a ensures that only the owner, e.g., a participant or node of the swarm learning network, of a raw data record (that encrypted the raw data record) can decrypt the now-encrypted raw data record. For example, referring back to FIG. 2B, a first node training ML model 222A may use a symmetric key to encrypt the raw data extracted from ML model 222A, a second node training ML model 222B may use another symmetric key to encrypt the raw data extracted from ML model 222B, and so on. Moreover, only the first node may decrypt the raw data extracted from ML model 222A using the symmetric key, only the second node may decrypt the raw data extracted from ML model 222B using its symmetric key, and so on. Each node may have its own, unique symmetric key. In some embodiments, each node's unique symmetric key can be user-defined, e.g., according to their infrastructure.

Each node further creates a secure cryptographic hash by performing a secure hashing operation 310 to create a secure hash 312, of each encrypted raw data record, e.g., encrypted raw data record 308. Secure hashing operation 310 can be performed using a private key of the node. Hashing encrypted raw data record 308 ensures that the privacy of the raw data record 304 is preserved, and also destroys any pattern that might be deciphered using, e.g., a metadata analysis technique. It should be noted that hashing encrypted raw data record 308 reduces the file size of, yet still identifies the raw data record 304. For example, raw data record 304 may be a computed tomography (CT) scan file that can be on the order of 20 to 30 gigabytes in size. Secure hash 312 of encrypted raw data file 308 may only be a 256 byte fingerprint of encrypted raw data record 308, where a single byte change in the file results in a hash change, thereby preventing tampering with the file, as any tampering would be easily identified. Secure hash 312 may be locally stored in the node's sequential, append only, secure data store that can be any key-value store that has been sufficiently hardened (e.g., an external component akin to a database). In some embodiments, the sequential aspect allows preserving the order in which entries are made (i.e., to create and later verify the Merkle tree). The append only aspect is leveraged so that entries may only be added to the store, and no updating of an existing record is possible to ensure non-repudiation. The secure aspect of the store is leveraged to avoid any un-authorized modifications.

As alluded to above, the value of a data contribution is premised, at least in part, on its uniqueness. That is, data contributors, in conventional systems may attempt to exaggerate their data contribution in terms of the amount of data contributed by providing duplicate data. In accordance with various embodiments, a deduplication operation 314 can be performed to remove any duplicate hashes. In this way, only unique data contributions are recorded in the node's sequential, append only, secure data store, and ultimately, rewarded. It should be noted that any known or future deduplication method(s) may be used. At each node's sequential, append only, secure data store, a sequential hash list 316 can be stored, or in some embodiments, can be maintained in a linked-list.

At the end of each epoch, e.g., when each node performs a check-in operation (when a node is ready to merge its data with that of other nodes), a Merkle tree is built, and Merkle root is determined. If a node goes down for some reason, and must restart, the node will attach its previously published Merkle root to the current Merkle root, and publish the resultant Merkle root to the blockchain ledger 238 in a ledger block. It should be understood that a Merkle tree can refer to a binary hash tree in which every leaf node (not to be confused with nodes of a network) is a hash of a data block, in this case, a raw data record block, and every non-leaf node is the cryptographic hash of the labels of its child nodes. Merkle trees allow for efficient and secure verification of the content of data structures—hence the reason for leveraging Merkle tree representations of a node's data contribution(s) in accordance with various embodiments. Merkle trees are generally constructed using nodes at the same height (described below), concatenating the node values at the same height, and hashing the result of the concatenation(s) until a root has is achieved. Once a Merkle tree is generated, the root hash is the only way to audit data (Merkle-Proof), where a branch is recreated containing the data from the Merkle root to the data being audited.

Figure 3B:
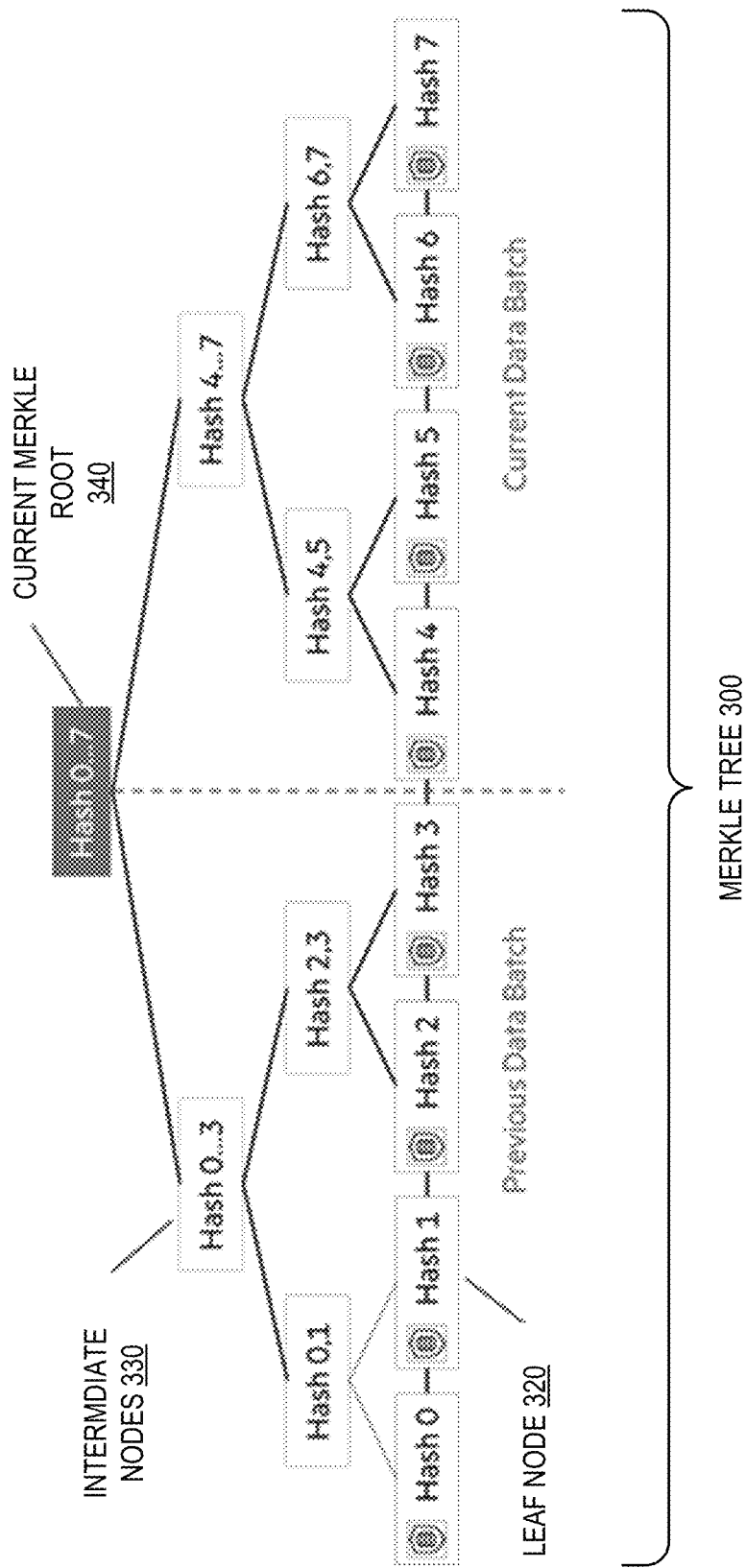
FIG. 3B illustrates example Merkle tree building and Merkle root determining in accordance with one embodiment of the disclosed technology.

FIG. 3B illustrates an example Merkle tree 300, where, in a previous raw data record batch, leaf nodes reflected as hashes 0, 1, 2, and 3, e.g., leaf node 320 which is a hash of a raw data block, e.g., secure hash 312. FIG. 3B illustrates that hashes 0 and 1 are concatenated into hash 0, 1, while hashes 2 and 3 are concatenated into hash 2,3. Hash 0 . . . 3 is a concatenation of hashes 0,1 and 2,3, and represent intermediate (non-leaf nodes), an example of which is intermediate node 330. In a current raw data record batch, hashes 4 and 5 are concatenated as hash 4,5, while hashes 6 and 7 are concatenated as hash 6,7, and so on. The resulting current Merkle root 340 of Merkle tree 300 is hash 0 . . . 7. It should be noted that a current Merkle root, e.g., current Merkle root 340, is representative of a current/just-completed epoch, where each node performs a "check-in" operation to be registered in blockchain ledger 238. It should be understood at a current Merkle can be combined with a previous Merkle root to arrive at a resultant Merkle root that is registered. Accordingly, not only is a node's contribution verifiable (as will be described below in greater detail) through the use of Merkle trees, but as noted above, the size of a data record, e.g., raw data record 304, can be reduced. Moreover, for every epoch reported, only the resultant Merkle root is registered to the blockchain ledger 238 so that the size of the data that is registered as a node's state is always constant.

Figure 4:
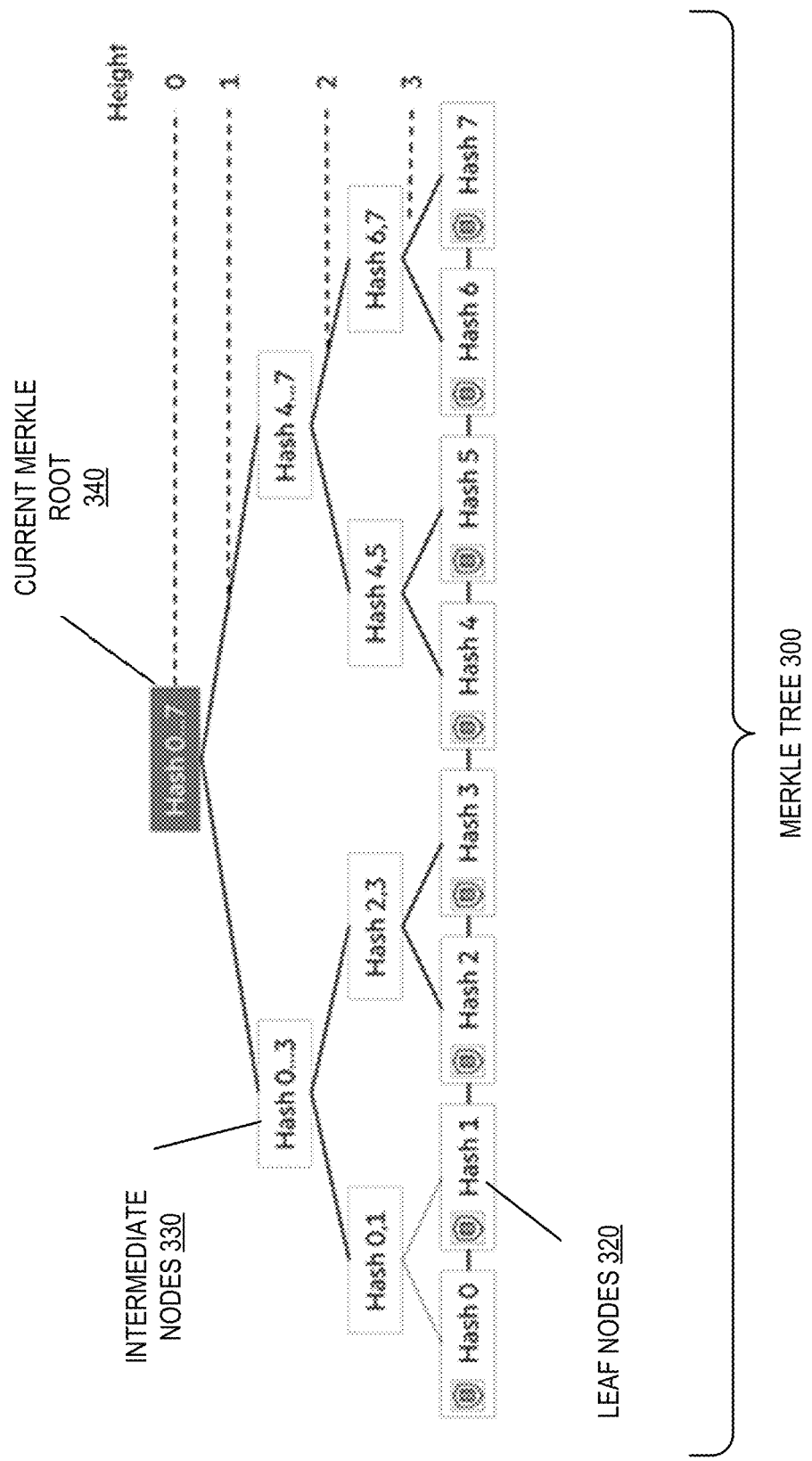
FIG. 4 illustrates an example of Merkle tree height calculation during a reward claim phase of swarm learning in accordance with one embodiment of the disclosed technology.
Figure 5:
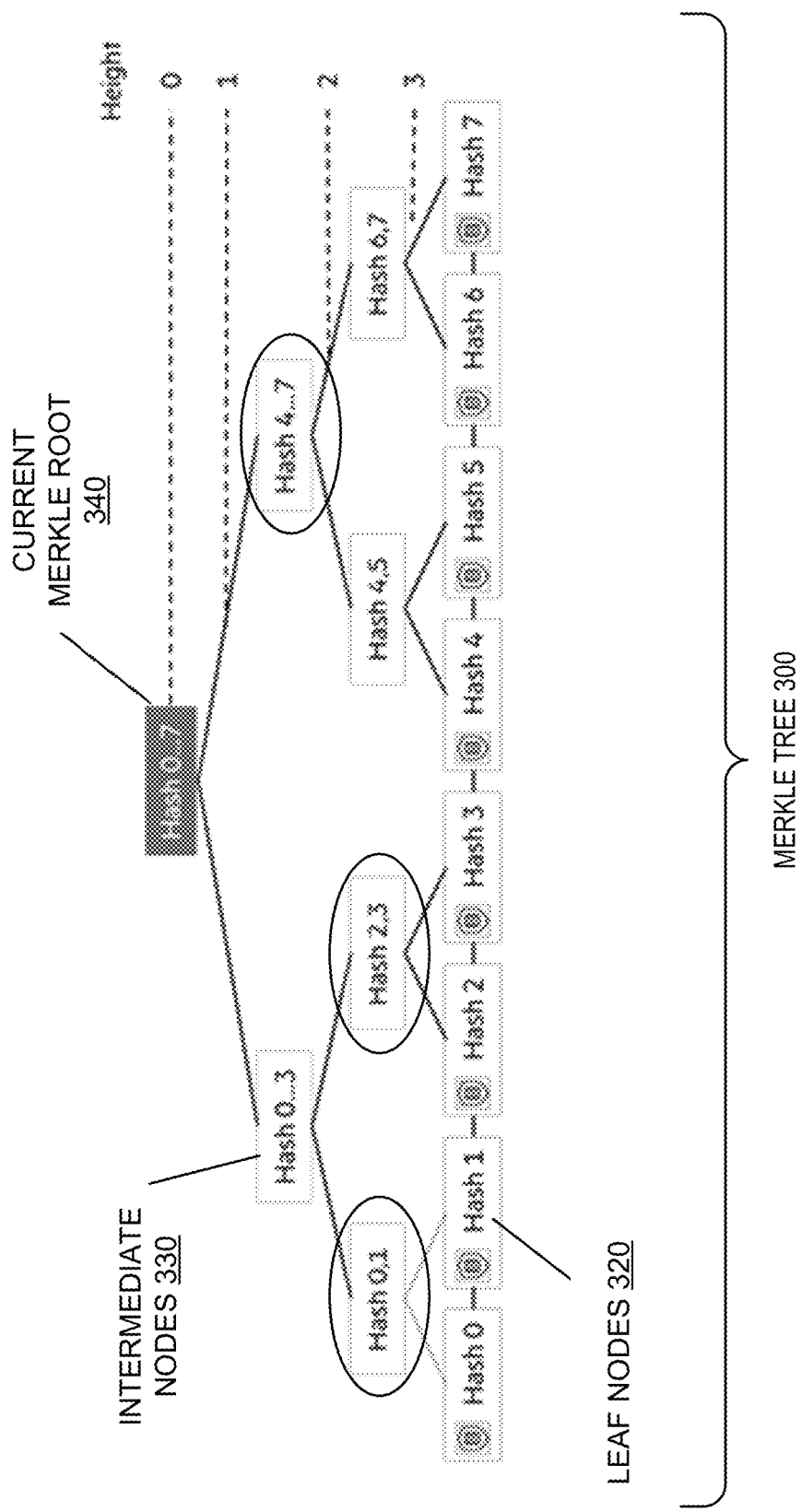
FIG. 5 illustrates an example of Merkle tree height verification during a reward verification phase of swarm learning in accordance with one embodiment.

As noted above, the monetization of data contributions in accordance with various embodiments may involve a reward phase during which every node that has contributed data to train an ML model, e.g., ML models 222A, 222B . . . , 222N, makes a reward claim. A node's reward claim can be based on the height of the Merkle tree created during the above-described contribution phase. FIG. 4 illustrates an example Merkle tree height determination or calculation based on the Merkle tree 300 of FIG. 3B. As alluded to above, Merkle trees can be constructed by concatenating node values at the same height. FIG. 4 illustrates these heights, where the height of a node equals the number of edges from that node to its deepest leaf, and the height of a Merkle tree is the height of the Merkle root, in this case, tree. In a binary Merkle tree, the number of leaf nodes can be based on the height function, $2^{(K)}$. In this example, the height of Merkle tree 300, which equals three, means there are eight leaf nodes (corresponding to hashes 0, 1, 2, 3 . . . 7). Hence, the height of Merkle tree 300 is indicative of the amount of raw data records shared/contributed by each node in the swarm learning network.

Because Merkle tree height is representative of the data shared by each node in a swarm learning network, because (as noted above), the Merkle root is published to the blockchain ledger, and because the Merkle root is representative only of unique data, a node's "true" data contribution is recorded and verifiable. Accordingly, the verification phase will be described next. In accordance with various embodiments, a node may make or submit a reward claim, as previously described. It should be understood that a node can be an entity such as a hospital, oil refinery, smart car, data center, etc. or any entity that contributes data to train an ML model. The verification phase provides an opportunity for the veracity of a node's reward claim to be determined. That is, depending on the mechanism used by the swarm learning network to submit a reward claim, an opportunity still exists for a node, node owner, participant, etc. to still exaggerate its contribution.

Using the example Merkle tree 300, verification of a node's contribution can be based on a Merkle proof. That is, to verify data corresponding to leaf node 320/hash 1, hash 0,1 and hash 2,3 (which make up hash 0 . . . 3, and hash 4 . . . 7 would be used. Recall that each leaf node is a hash of some data element, in this case, a raw data record contributed by a node, and that the resulting hash(es) of each raw data record are concatenated until a Merkle root is reached. Based on these values, hash 0 . . . 7 can be calculated. If the calculated hash 0 . . . 7 matches or equals that of hash 0 . . . 7 (the Merkle root) recorded in the blockchain ledger, the Merkle tree height is verified. If the calculated hash 0 . . . 7 does not match that of the hash 0 . . . 7 stored in the blockchain ledger, it can be assumed that the node has made an improper reward claim. In general, the aforementioned height function, $2^{(K)}$ suggests that if a root node corresponds to a Merkle tree height K, K hashes are sent by the In the verification phase, a group of peer nodes or participants can challenge another peer's/participant's reward claim. In some embodiments, a quorum or some minimum number of peer nodes or participants perform the challenge, and it should be understood that the more challengers/verifiers, the stronger the evidence that a reward claim is valid/invalid. This quorum or minimum threshold of peer nodes can be a user-defined parameter. In particular, every challenging node selects one or more Merkle roots registered in the blockchain ledger during the check-in process, and requests a Merkle proof for each of the one or more selected Merkle roots. It should be noted that these challenges can occur concurrently (meaning a group of nodes can, at the same time, challenge another node) and in parallel (meaning different groups of nodes can challenge different nodes) during the training of a model. Because the Merkle root is recorded in the blockchain ledger, the challenged node, based on the above example, would transmit the value of hash 0,1, hash 2,3, and hash 4 . . . 7 to a challenging node, allowing the challenging node to verify the challenged node's contribution and reward claim. In some embodiments, the challenging node registers the outcome of each challenge it requests on the blockchain ledger. After some threshold number of challenges that a challenged node successfully passes is recorded on the blockchain register, the challenged node's reward claim(s) may be approved and cleared for reward distribution. It should be noted that in accordance with some embodiments, a maximum depth associated with a challenge can be specified for the sake of efficiency and speed. That is, because of the way hashes are concatenated, even a Merkle tree that is built based on, e.g., one million data points, can be sufficiently challenged with a maximum of about twenty to twenty one hashes. It should be understood that a minimum number of hashes/challenged depth can also be specified depending on the level of accuracy a rewarding entity wishes to support, the context of an ML model, etc.

It should be understood that blockchain ledger/register contains a sequent of Merkle roots registered on a per-epoch basis, and so verification as disclosed herein is, in essence, a sampling process to verify the claimed hashes are present (and by implication, the raw data). For example, if a node is challenged to prove its hashes associated with the last epoch, at least the hashes associated with a starting epoch and some "middle" epoch must be verified. In some embodiments, verification can be based on verifying hashes/Merkle roots from random epochs.

Once a reward claim from a node has been verified, the reward calculation phase can commence. In some embodiments, a node may determine the number of individual data points corresponding to a raw data record that the node contributed to the ML model using the Merkle tree height K (based, as described above, on the height function $2^{(K)}$). This determined contribution can be published to the blockchain ledger. Additionally, all the nodes that have verified contributions calculate the sum of the verified contributions of all other nodes. This "total" contribution can also be recorded on the blockchain ledger. Thus, each contributing node can be rewarded based on its percentage contribution to the total contribution calculated by determining a node's individual contribution divided by the total contribution. It should be noted that even when a node is down/inoperative, it may not be contributing data, but model training activity can still occur. It should also be noted that determining a percentage calculation can be normalized so that it can multiplied by any reward/bounty value to extract a node's share of the reward. It should be noted that if a particular node fails a challenge, or fails some minimum threshold number of challenges, that node can be levied any one or more pre-agreed upon penalties for submitting an inaccurate/untruthful reward claim(s).

For additional security, a reward signoff phase may begin after the amount of each contributing node's award is calculated. In accordance with some embodiments, a group of nodes, e.g., the same group of nodes that challenged a peer/contributing node's reward claim can sign off on the peer/contributing node's published contribution. Signing off can be accomplished using digital signatures.

Lastly, upon receiving the requisite number of signoffs, a contributing node can stake it's claim for its percentage share of the reward.

In view of the above, a node can perform various operations in accordance with various embodiments, as described below and illustrated in FIGS. 6A and 6B.

Figure 6A:
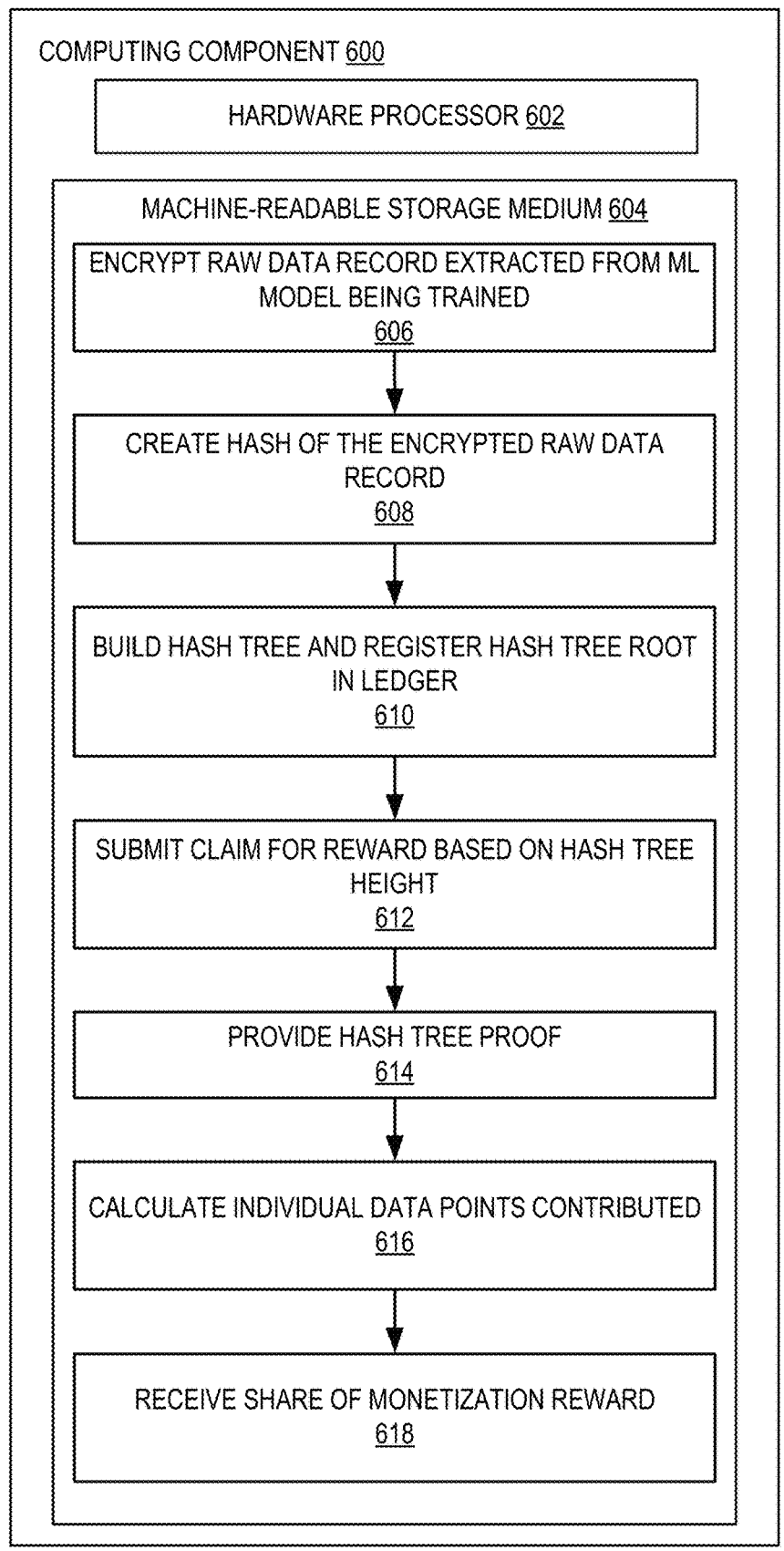
FIG. 6A is an example computing component that may be used to implement reward distribution in accordance with one embodiment of the disclosed technology.

FIG. 6A is an example computing component 600 that may be used to implement various features of a contributing node in a swarm learning network in accordance with one embodiment of the disclosed technology. Computing component 600 may be, for example, a computer, a controller, or any other similar computing component capable of processing data. In the example implementation of FIG. 6, the computing component 600 includes a hardware processor 602, and machine-readable storage medium 604. In some embodiments, computing component 600 may be an embodiment of processor 50 of edge node 10 (FIG. 1C) that trains a model, e.g., ML model 222A of FIG. 2B.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-618, to control processes or operations for monetizing data contributed to ML model training in a swarm learning network. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-618.

Hardware processor 602 may execute instruction 606 to encrypt a raw data record extracted from an ML model that is being trained. As noted above, in a swarm learning network, multiple nodes across a distributed ML network can be used to train a local instance of version of an ML model using data locally provided by each of the multiple nodes. Hardware processor 602 may further execute instruction 608 to create a hash (e.g., a secure cryptographic hash) of the encrypted raw data record. Hashing reduces the file size associated with a raw data record, while creating a unique fingerprint representative of the raw data record. In this way, large amounts of data can be easily identified using a data element's hash.

Hardware processor 602 may execute instruction 610 to build a hash tree (based on the secure cryptographic hash of the encrypted raw data record), and register a hash tree root corresponding to the hash tree in a distributed ledger of a blockchain network, i.e., a swarm learning network. The hash tree root can be used to verify a data contributing/data monetization network node's reward claim as noted above. Accordingly, hardware processor 602 may then submit a claim for a reward represented by a height of the hash tree. In some embodiments, as described above, the hash tree may be a Merkle tree, and more specifically a binary Merkle tree. It should be noted that although various embodiments described herein utilize a binary Merkle tree, other types of Merkle trees, e.g., hexadecimal Merkle trees can be used as an optimization mechanism in addition to/after generating a binary Merkle tree.

Hardware processor 602 may further execute instruction 614 to provide a hash tree proof. In this way, a node cannot exaggerate or "overstate" its data contribution to the ML model training process. In particular, the hash tree proof can be provided to a plurality of other network nodes in the blockchain/swarm learning network that challenge a data contribution/data monetization network node. In some embodiments, a smart contract, e.g., smart contract 44, may specify the number of other network nodes needed to challenge the reward claim submitted by a data contributing/data monetization network node. The hash tree proof, e.g., a Merkle proof, can be used to verify the height of the hash tree, e.g., a Merkle tree.

Hardware processor 602 may execute instruction 616 to calculate an amount of individual data points contributed by the data monetization/data contribution network node. The amount of individual data points corresponds to the calculated height of the hash tree. Other data monetization/data contributing network nodes of the swarm learning network can each submit their respective data point contributions, and each of these data monetization/data contributing network nodes can, based on the individual data point contributions registered in the distributed ledger, calculate a total number of data point contributions. Having each data monetization/data contributing network node in the swarm learning network compute its own data point contribution as well as the total data point contribution across the entire swarm learning network provides a mechanism for ensuring accurate reward calculation. In some embodiments, as described above, the calculated amount of individual data points may comprise some share of the total monetization reward, e.g., a percentage share of the total monetization reward.

Figure 6B:
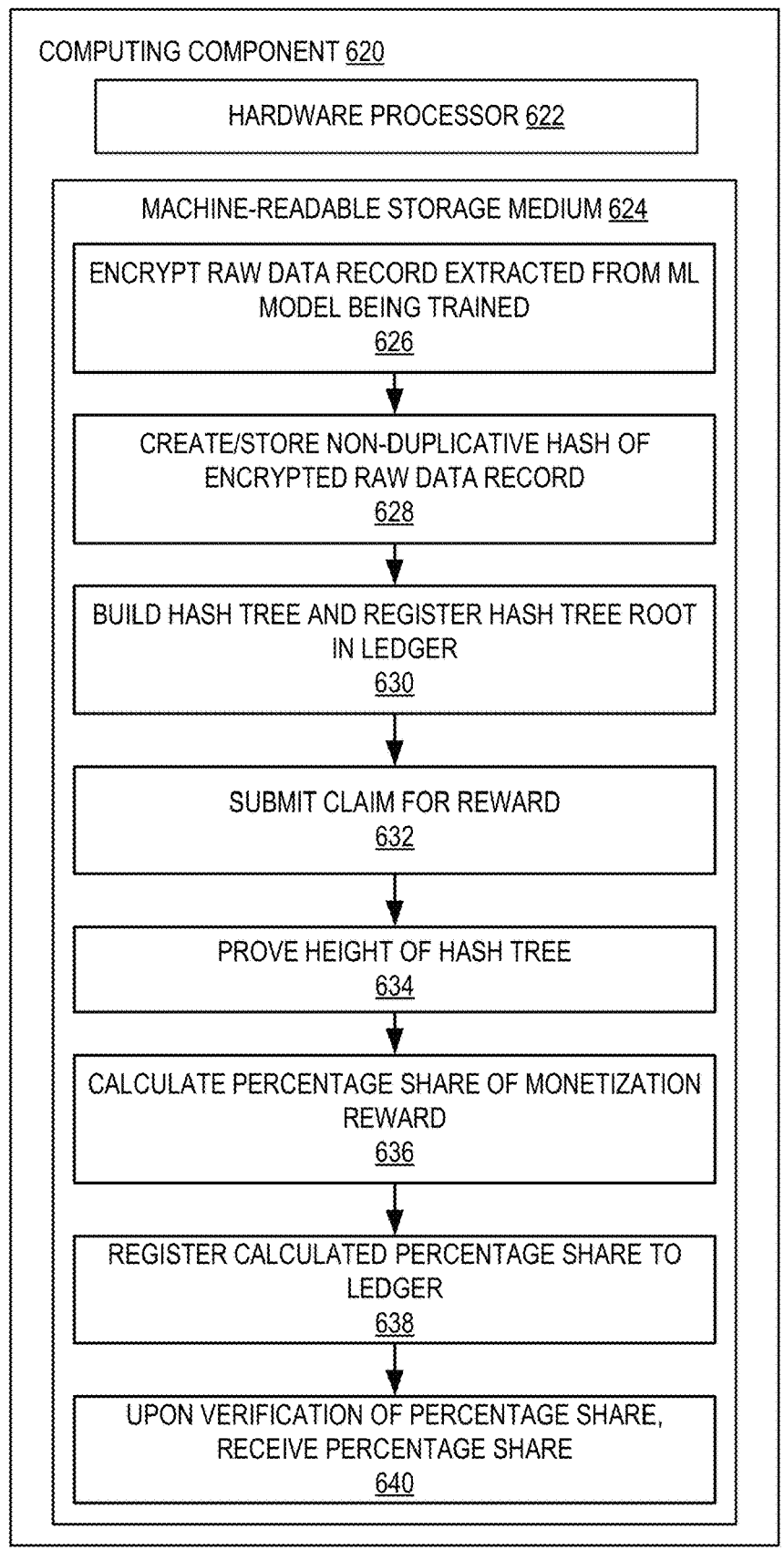
FIG. 6B is an example computing component that may be used to implement reward claim verification in accordance with one embodiment of the disclosed technology.

FIG. 6B is an example computing component 620 that may be used to implement various features of a contributing node in a swarm learning network in accordance with another embodiment of the disclosed technology. Hardware processor 622 may be a processor that is the same or similar to hardware processor 602 of FIG. 6A, and machine-readable storage medium 624 may be a storage medium that is the same or similar to machine-readable storage medium 604 of FIG. 6A. Similarly still, hardware processor 622 may be an embodiment of processor 50 of an edge node, e.g., edge node 10, which may be embodied as a data monetization/data contributing network node of a blockchain/swarm learning network leveraging distributed ML. Hardware processor 622 may fetch, decode, and execute instructions, such as instructions 626-640, to control processes or operations for monetizing data contributed to ML model training in a swarm learning network.

Like hardware processor 602, hardware processor 622 may execute instruction 626 to encrypt a raw data record extracted from an ML model being trained, and also like hardware processor 602, hardware processor 622 may execute instruction 628 to create a hash of the encrypted raw data record, as well as store that hash in a local data store of the data monetization/data contributing network node. Moreover, it should be noted that the hash that is stored may be a non-duplicative hash. As described above, data contributions can be mischaracterized by a participant in the swarm learning network by duplicating data contributions, which if left unchecked, could result in that participant receiving a larger reward than is actually warranted. Accordingly, a deduplication operation(s) may be performed at the contributing network to remove any duplicate hashes.

Hardware processor 622 may execute instruction 630 to build a hash tree and register the corresponding hash tree root in a distributed ledger of the blockchain/swarm learning network. Registering the hash tree root creates an immutable record of a data monetization/data contributing network node's contribution to the training of an ML model which can be verified, ensuring the accuracy of any reward claim made by the data monetization/data contributing network node.

Hardware processor 622 may also execute instruction 632 to submit a claim for a reward represented by a height of the hash, tree, which in one embodiment, may be a binary Merkle tree. As part of a verification process, hardware processor 622 may execute instruction 634 to prove the height of the hash tree. In particular, and as described above, multiple peer data monetization/data contributing network nodes may challenge the reward claim submitted by another data monetization/data contributing network node. Proof of the height of the hash tree can be accomplished by providing the requisite hashes to each of the challenging data monetization/data contributing network nodes to allow those nodes to calculate the hash tree root. If the challenging data monetization/data contributing network nodes calculate a hash tree root that matches the hash tree root registered by the challenging data monetization/data contributing network node to the distributed ledger, the height of the hash tree can be considered valid.

Hardware processor 622 may execute instruction 636 to calculate a percentage share of a monetization reward for training the ML model, and instruction 638 to register the calculated percentage share to the distributed ledger. In some embodiments this calculated percentage share of the monetization reward can be verified as well by a plurality of peer data monetization/data contributing network nodes. Accordingly, hardware processor 622 may execute instruction 640 to receive the calculated percentage share upon verification of the calculated percentage share.

Various embodiments disclosed herein as well as other embodiments contemplated in accordance with the disclosed technology allow for transparent reward sharing in a swarm learning context, even in the presence of faults. Coordinating and controlling operations performed by the nodes can be programmed using smart contracts of the underlying blockchain network or platform to accommodate current and future models of reward sharing. Moreover, as described above, the swarm learning network or platform implemented across the nodes operating in the swarm learning network/platform can be decentralized with no single point of control that can dominate or otherwise subvert the reward sharing process. Further still, the hashing aspect of the disclosed technology allows the swarm learning platform to be agnostic to the raw data contributed by the nodes, and therefore, preserve the privacy of the data itself/the participant/node contributing the data. Additionally still, multiple aspects, phases, stages (including node states and data contributions), etc. of the swarm learning process can be recorded in a distributed ledger for auditing.

Figure 7:
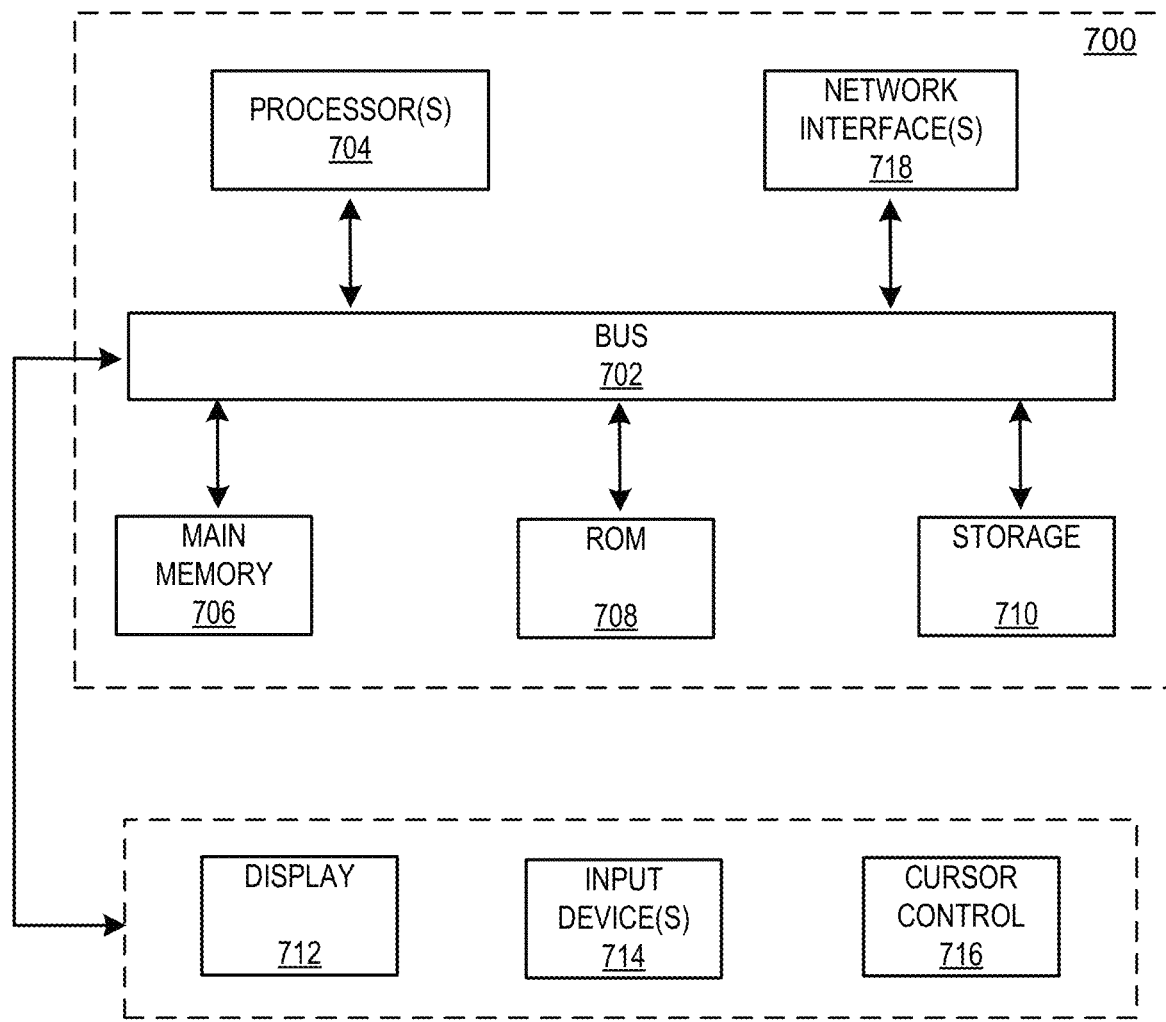
FIG. 7 is an example computing component that may be used to implement various features of embodiments of the present disclosure.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A first computing node to operate in a blockchain network, comprising:
   a processor; and
   a non-transitory storage medium storing instructions executable on the processor to:
      train, at the first computing node, a machine learning model as part of distributed machine learning performed by a plurality of computing nodes including the first computing node;
      output a model parameter produced by the training of the machine learning model from the first computing node to a second computing node of the plurality of computing nodes for merging of the model parameter from the first computing node with model parameters from other computing nodes of the plurality of computing nodes;
      receive, at the first computing node from the second computing node, a merged parameter produced by the merging of the model parameter from the first computing node with the model parameters from the other computing nodes;
      update, at the first computing node, the machine learning model using the merged parameter;
      encrypt a raw data record extracted from the machine learning model being trained;
      create a secure cryptographic hash of the encrypted raw data record;
      build a hash tree based at least on the secure cryptographic hash of the encrypted raw data record, and register a corresponding hash tree root in a distributed ledger of the blockchain network;
      submit a claim for a reward represented by a height of the hash tree;
      provide a hash tree proof to each of the other computing nodes in the blockchain network, the hash tree proof verifying the height of the hash tree in response to a verification challenge from a computing node of the plurality of computing nodes;
      calculate an amount of individual data points contributed by the first computing node based upon the height of the hash tree, the calculated amount of individual data points comprising a share of a monetization reward for the training of the machine learning model at the first computing node; and
      receive the share of the monetization reward.

2. The first computing node of claim 1, wherein the instructions are executable on the processor to encrypt the raw data record utilizing a symmetric encryption key to encrypt the raw data record, and wherein the raw data record is extracted from an input layer of the machine learning model.

3. The first computing node of claim 1, wherein the hash tree comprises a binary Merkle tree.

4. The first computing node of claim 1, wherein the instructions are executable on the processor to build the hash tree by:
   determining an end of an epoch during the training of the machine learning model, and
   building the hash tree subsequent to the end of the epoch.

5. The first computing node of claim 1, wherein the instructions are executable on the processor to build the hash tree for a current iteration of the distributed machine learning by:
   determining an existence of a previous hash tree built during a previous iteration of the distributed machine learning, and
   attaching the hash tree to the previous hash tree.

6. The first computing node of claim 1, wherein the training of the machine learning model at the first computing node comprises training a local version of the machine learning model at the first computing node, wherein the distributed machine learning performed by the plurality of computing nodes further comprises training a further local version of the machine learning model at a further computing node of the plurality of computing nodes, and wherein the model parameters from the other computing nodes comprise a model parameter produced by the training of the further local version of the machine learning model at the further computing node.

7. The first computing node of claim 5, wherein the instructions are executable on the processor to calculate the corresponding hash tree root based on the previous hash tree and the hash tree.

8. The first computing node of claim 1, wherein the corresponding hash tree root is registered in the distributed ledger in conjunction with one or more parameters derived from the distributed machine learning.

9. The first computing node of claim 1, wherein the instructions are executable on the processor to confirm that the secure cryptographic hash is not a duplicate of a hash of another raw data record.

10. The first computing node of claim 9, wherein the instructions are executable on the processor to store the secure cryptographic hash in response to confirming that the secure cryptographic hash is not a duplicate of the hash of another raw data record.

11. The first computing node of claim 1, wherein the instructions are executable on the processor to provide the hash tree proof by sending a number of hashes corresponding to the height of the hash tree to the other computing nodes.

12. The first computing node of claim 1, wherein the instructions are executable on the processor to receive clearance to receive the share of the monetization reward in response to receiving a threshold number of approvals from a subset of the other computing nodes.

13. The first computing node of claim 1, wherein the instructions are executable on the processor to receive at least one penalty for submitting an inaccurate claim for a reward defined by a smart contract applicable to the blockchain network.

14. The first computing node of claim 1, wherein the instructions are executable on the processor to download, at the first computing node, a swarm learning program to perform the training, wherein the swarm learning program is also downloaded at the other computing nodes to perform the distributed machine learning.

15. The first computing node of claim 1, wherein the second computing node is a leader computing node, and wherein the instructions are executable on the processor to elect, by the first computing node in conjunction with the other computing nodes, the leader computing node for an iteration of the distributed machine learning.

16. A non-transitory machine-readable storage medium comprising instructions that upon execution cause a first computing node to:
- train, at the first computing node, a machine learning model as part of distributed machine learning performed by a plurality of computing nodes including the first computing node in a blockchain network;
- output a model parameter produced by the training of the machine learning model from the first computing node to a second computing node of the plurality of computing nodes for merging of the model parameter from the first computing node with model parameters from other computing nodes of the plurality of computing nodes;
- receive, at the first computing node from the second computing node, a merged parameter produced by the merging of the model parameter from the first computing node with the model parameters from the other computing nodes;
- update, at the first computing node, the machine learning model using the merged parameter;
- encrypt a raw data record extracted from the machine learning model being trained;
- create a secure cryptographic hash of the encrypted raw data record;
- build a hash tree based at least on the secure cryptographic hash of the encrypted raw data record, and register a corresponding hash tree root in a distributed ledger of the blockchain network;
- submit a claim for a reward represented by a height of the hash tree;
- provide a hash tree proof to a further computing node in the blockchain network, the hash tree proof verifying the height of the hash tree in response to a verification challenge from the further computing node;
- calculate an amount of individual data points contributed by the first computing node based upon the height of the hash tree, the calculated amount of individual data points comprising a share of a monetization reward for the training of the machine learning model at the first computing node; and
- receive the share of the monetization reward.

17. The non-transitory machine-readable storage medium of claim 16, wherein the raw data record is extracted from an input layer of the machine learning model.

18. The non-transitory machine-readable storage medium of claim 16, wherein the instructions upon execution cause the first computing node to:
- download, at the first computing node, a swarm learning program to perform the training, wherein the swarm learning program is also downloaded at the other computing nodes to perform the distributed machine learning.

19. The non-transitory machine-readable storage medium of claim 16, wherein the training of the machine learning model at the first computing node comprises training a local version of the machine learning model at the first computing node, wherein the distributed machine learning performed by the plurality of computing nodes further comprises training another local version of the machine learning model at another computing node of the plurality of computing nodes, and wherein the model parameters from the other computing nodes comprise a model parameter produced by the training of the another local version of the machine learning model at the another computing node.

20. The non-transitory machine-readable storage medium of claim 16, wherein the second computing node is a leader computing node, and wherein the instructions upon execution cause the first computing node to:
- elect, by the first computing node in conjunction with the other computing nodes, the leader computing node for an iteration of the distributed machine learning.

* * * * *